(12) United States Patent
Naujok et al.

(10) Patent No.: US 12,114,150 B2
(45) Date of Patent: Oct. 8, 2024

(54) AUTHENTICATED COMMUNICATIONS DEVICE TO TIE REAL-WORLD AND DIGITAL IDENTITIES

(71) Applicant: PROVE IDENTITY, INC., New York, NY (US)

(72) Inventors: Jeffrey Naujok, Colorado Springs, CO (US); Christopher Cunningham, Highlands Ranch, CO (US); Prashant Janakrai Desai, New York, NY (US); Rodger R. Desai, New York, NY (US)

(73) Assignee: Prove Identity, Inc., New York, NY (US)

( * ) Notice: Subject to any disclaimer, the term of this patent is extended or adjusted under 35 U.S.C. 154(b) by 231 days.

(21) Appl. No.: 17/558,570

(22) Filed: Dec. 21, 2021

(65) Prior Publication Data

US 2022/0201476 A1    Jun. 23, 2022

Related U.S. Application Data

(60) Provisional application No. 63/130,309, filed on Dec. 23, 2020.

(51) Int. Cl.
*H04W 12/06* (2021.01)
*H04W 12/72* (2021.01)
*H04W 88/02* (2009.01)

(52) U.S. Cl.
CPC .......... *H04W 12/06* (2013.01); *H04W 12/72* (2021.01); *H04W 88/02* (2013.01)

(58) Field of Classification Search
CPC ..... H04W 12/06; H04W 12/72; H04W 88/02; H04W 12/66
See application file for complete search history.

(56) References Cited

U.S. PATENT DOCUMENTS

| 7,587,368 B2 | 9/2009 | Felsher |
| 8,646,103 B2 * | 2/2014 | Jakobson ............ H04L 63/0407 726/30 |

(Continued)

FOREIGN PATENT DOCUMENTS

| EP | 1936528 | 6/2008 |
| JP | H11338933 | 12/1999 |

(Continued)

OTHER PUBLICATIONS

U.S. Appl. No. 17/031,696: Notice of Abandonment dated May 26, 2023, 2 pages, Doc 1937.

(Continued)

*Primary Examiner* — Baotran N To
(74) *Attorney, Agent, or Firm* — Husch Blackwell LLP; Bryan D. Stewart; Matthew Francis

(57) ABSTRACT

Briefly, example methods, apparatuses, and/or articles of manufacture are disclosed that may be utilized to bring about accessing a data store to determine that signal packets have been received, via an electronic communications network, from a communications device that is to be verified. The communications device being co-located with a real-world identity. The method may additionally include electronically determining that a subscriber account identifier or a subscriber-unique alias is bound to an account held by the real-world identity and electronically tying the subscriber account identifier or the subscriber-unique alias to the real-world identity in response to electronically verifying the communications device after determining that the signal packets have been received from the communications device and in response to electronically determining that the subscriber account identifier or the subscriber-unique alias is bound to the account held by the real-world identity.

28 Claims, 7 Drawing Sheets

(56) References Cited

U.S. PATENT DOCUMENTS

| | | | |
|---|---|---|---|
| 9,349,014 | B1 | 5/2016 | Hubing et al. |
| 9,870,464 | B1 | 1/2018 | Kane-Parry et al. |
| 10,686,781 | B1 | 6/2020 | Kaditz et al. |
| 10,824,702 | B1 | 11/2020 | Shahidzadeh et al. |
| 2006/0282662 | A1 | 12/2006 | Whitcomb |
| 2007/0060097 | A1 | 3/2007 | Edge et al. |
| 2008/0214153 | A1 | 9/2008 | Ramer et al. |
| 2009/0328173 | A1 | 12/2009 | Jakobson et al. |
| 2010/0080369 | A1 | 4/2010 | Hurst et al. |
| 2010/0312703 | A1 | 12/2010 | Kulpati et al. |
| 2011/0287782 | A1 | 11/2011 | Ho et al. |
| 2012/0184291 | A1 | 7/2012 | Tietsch et al. |
| 2013/0060665 | A1 | 3/2013 | Davis et al. |
| 2014/0189861 | A1 | 7/2014 | Gupta et al. |
| 2014/0282870 | A1 | 9/2014 | Markwordt et al. |
| 2014/0359722 | A1 | 12/2014 | Schultz et al. |
| 2015/0106955 | A1 | 4/2015 | Soelberg et al. |
| 2015/0139407 | A1 | 5/2015 | Maguire et al. |
| 2017/0085568 | A1 | 3/2017 | Rolfe et al. |
| 2017/0238129 | A1 | 8/2017 | Maier et al. |
| 2018/0212971 | A1 | 7/2018 | Costa |
| 2019/0007553 | A1 | 1/2019 | Noldus |
| 2019/0080155 | A1 | 3/2019 | Ganong et al. |
| 2019/0208354 | A1 | 7/2019 | Raduchel et al. |
| 2019/0238531 | A1 | 8/2019 | Ganesan |
| 2020/0042685 | A1 | 2/2020 | Tussy et al. |
| 2020/0167453 | A1 | 5/2020 | Bouse |
| 2020/0210988 | A1 | 7/2020 | Woodward |
| 2020/0364366 | A1 | 11/2020 | Kundu et al. |
| 2020/0366671 | A1 | 11/2020 | Larson et al. |
| 2020/0382364 | A1 | 12/2020 | Kilburn |
| 2021/0044161 | A1 | 2/2021 | Kantorowicz |
| 2021/0044616 | A1 | 2/2021 | Kantorowicz et al. |
| 2021/0058507 | A1 | 2/2021 | Cornwell |
| 2021/0105271 | A1 | 4/2021 | Nitturkar et al. |
| 2021/0168148 | A1 | 6/2021 | Boodaei et al. |
| 2021/0204116 | A1* | 7/2021 | Naujok ............... H04W 12/68 |
| 2022/0012743 | A1 | 1/2022 | Snell et al. |
| 2022/0129900 | A1* | 4/2022 | Naujok ............... H04W 12/66 |
| 2022/0210657 | A1* | 6/2022 | Desai ............... H04W 12/12 |
| 2022/0377065 | A1* | 11/2022 | Naujok ............... H04W 12/71 |

FOREIGN PATENT DOCUMENTS

| | | |
|---|---|---|
| JP | 2001175599 A | 6/2001 |
| JP | 2002259344 A | 9/2002 |
| JP | 2003186838 A | 7/2003 |
| JP | 2005209083 A | 8/2005 |
| JP | 2006221440 A | 8/2006 |
| JP | 2007102777 A | 4/2007 |
| JP | 2007328381 A | 12/2007 |
| JP | 2013518348 A | 5/2013 |
| WO | WO2007026486 | 3/2007 |
| WO | WO2007103831 | 9/2007 |
| WO | WO2007107868 | 9/2007 |
| WO | WO2008123461 | 10/2008 |

OTHER PUBLICATIONS

U.S. Appl. No. 16/730,878: AFCP Request & Response to Final dated May 30, 2023, 20 pages, Doc 1938.
U.S. Appl. No. 16/730,878: Advisory Action dated Jun. 13, 2023, 5 pages, Doc 1939.
U.S. Appl. No. 16/730,878: RCE & Amendment filed Jun. 28, 2023, 23 pages, Doc 1940.
BR Application No. 1120230126002: Brazil Application filed Jun. 22, 2023, 107 pages, Doc 1941.
CA Application No. 3202486: Canada Application filed Jun. 15, 2023, 2 pages, Doc 1942.
EP Application No. 21912241.3: European Application filed Jun. 15, 2023, 6 pages, Doc 1943.
EP Application No. 21912241.3: Rule 161-162 Communication received dated Aug. 1, 2023, 3 pages, Doc 1944.
IN Application No. 202347042104: India Application filed Jun. 23, 2023, 65 pages, Doc 1945.
BR Application No. 1120230131685: Brazil Application filed Jun. 29, 2023, 120 pages, Doc 1946.
CA Application No. 3202488: Canada Application filed Jun. 15, 2023, 2 pages, Doc 1947.
EP Application No. 21916545.3: European Application filed Jun. 15, 2023, 6 pages, Doc 1948.
EP Application No. 21916545.3: Rule 161-162 Communication received dated Aug. 8, 2023, 3 pages, Doc 1949.
IN Application No. 202347042972: India Application filed Jun. 27, 2023, 78 pages, Doc 1950.
U.S. Appl. No. 18/076,074: Notice of Publication dated Jun. 8, 2023, 1 page, Doc 1951.
U.S. Appl. No. 17/031,696: RCE & Response to Final Office Action filed Jun. 6, 2022, 20 pages, Doc 1865.
U.S. Appl. No. 17/031,696: Non-final Office Action dated Jun. 20, 2022, 21 pages, Doc 1866.
U.S. Appl. No. 17/031,696: Response to Non-Final Office Action filed Sep. 9, 2022, 15 pages, Doc 1867.
U.S. Appl. No. 17/031,696: Non-final Office Action dated Nov. 18, 2022, 39 pages, Doc 1863.
U.S. Appl. No. 16/730,878: Non-final Office Action dated Sep. 22, 2022, 38 pages, Doc 1848.
PCT Application No. PCT/US2021/065112: International Search Report and Written Opinion dated Mar. 22, 2022, 24 pages, Doc 1847.
U.S. Appl. No. 17/246,471: Notice of Publication date Nov. 3, 2022, 1 page, Doc 1864.
PCT Application No. PCT/US2021/065799: International Search Report and Written Opinion dated May 5, 2022, 24 pages, Doc 1830.
PCT Application No. PCT/US2022/26637: International Search Report and Written Opinion dated Jul. 18, 2022, 24 pages, Doc 1829.
U.S. Appl. No. 17/558,570: Notice of Publication dated Jun. 23, 2022, 1 page, Doc 1832.
U.S. Appl. No. 17/565,427: Notice of Publication dated Jun. 30, 2022, 1 page, Doc 1831.
U.S. Appl. No. 17/031,696: Response to Final Office Action filed May 6, 2022, 18 pages, Doc 1349.
U.S. Appl. No. 17/031,696: Advisory Action dated May 13, 2022, 3 pages, Doc 1350.
PCT Application No. PCT/US2021/065112: Response to Written Opinion filed Oct. 21, 2022, 7 pages, Doc 1877.
PCT Application No. PCT/US2021/065799: Demand & Response to Written Opinion filed Oct. 28, 2022, 30 pages, Doc 1878.
U.S. Appl. No. 16/730,878: Response to Non-Final Office Action filed Dec. 19, 2022, 17 pages, Doc 1872.
U.S. Appl. No. 18/076,074, filed Dec. 6, 2022, 64 pages, Doc 1879.
PCT Application No. PCT/US2022/052028: PCT Application filed Dec. 6, 2022, 63 pages, Doc 1868.
Anton—"Kodekey Biometric Authentication System Links Your Identity to Your Phone Number", TECHTHELEAD.com, Jan. 30, 2006, 6 pages, Doc 1212.
Burr—"Maximizing Consumer Contacts while Mitigating TCPA Risk"; Mar. 12, 2014, available at: https://www.neustar.biz/resources/videos/mitigate-tcpa-risk-aml-conections-video, 18 pages, Doc 1215.
Dryburgh, et al.; "Signaling System No. 7 (SS7/C7): Protocol, Architecture, and Services"; Cisco Press, Aug. 2, 2004 available at: http:!itechbus.safaribooksonline.com/book/electrica!-engineeringicommunicatio1H,e ngi neeri ng/1587050404/introductions-and-overviewsichi.13, 2 pages, Doc 1217.
Federal Communications Commission; "Wireless Local Number Portability (WLNP)—frequently asked questions"; May 18, 2016; available at:https://wireless.fcc.gov/wlnp/documents/wlnpfaqs.pdf, pages, Doc 1214.
Gralla; "How the Internet Works"; 2006; Que, pp. 346-347, Doc 1233.
Gueye—"Constraint-Based Geolocation of Internet Hosts", IEEE/ACM Transactions on Networking, vol. 14, No. 6, Dec. 2006, 14 pages, Doc 1210.

(56) References Cited

OTHER PUBLICATIONS

IP2LOCATION—"Identify Geographical Location and Proxy by IP Address", (http://www.ip2location.com), 2001, 6 pages, Doc 1208.
Katz-Bassett—"Towards IP Geolocation Using Delay and Topology Measurements" IMC'06, Oct. 25-27, 2006, Rio de Janeiro, Brazil, 13 pages, Doc 1211.
Malphrus; "Perspectives on Retail Payments Fraud"; Feb. 11, 2009, Economic Perspectives, vol. XXXIII, No. 1, 2009; available at: https://papers.ssrn.comisol3/papers.cfm?abstrnct_id:::1341233, 6 pages, Doc 1218.
Padmanabhan—"An Investigation of Geographic Mapping Techniques for Internet Hosts", SIGCOMM'01, Aug. 27-31, 2001, San Diego, CA, 13 pages, Doc 1209.
Quova "How we do it" (http://www.quova.com/what/how-we-do-it/), 2011, 3 pages, Doc 1250.
wiki.gis.com—Geolocation Software (http://en.wikipedia.org/wiki/Geolocation_software), Last Updated May 23, 2011, 4 pages, Doc 1207.
WOT Online; "How to interpret the reputation in reputation icon?"; 2006. Retrieved from http://web.archive.org/web/20061127233933/http://www.mywot.com/en/woUhelp/wot_symbols_explained, 3 pages, Doc 1213.
YTD2525—"Enterprise HLR Lookup Portal and API," published May 30, 2014 at blog YTD2525, citing hlr-lookups.com as the source, available at: https://ytd2525.wordpress.com/2014/05/30/enterprise-hlr-lookup-portal-and-api/, 5 pages, Doc 1216.
U.S. Appl. No. 17/031,696, filed Sep. 24, 2020, 65 pages, Doc 1219.
U.S. Appl. No. 17/031,696: Filing Receipt dated Oct. 14, 2020, 3 pages, Doc 1220.
U.S. Appl. No. 17/031,696: Non-final Office Action dated Sep. 15, 2021, 18 pages, Doc 1221.
U.S. Appl. No. 17/031,696: Response to Office Action filed Jan. 11, 2022, 16 pages, Doc 1222.
U.S. Appl. No. 17/031,696: Final Office Action dated Mar. 16, 2022, 32 pages, Doc 1223.
PCT Application No. PCT/US2020/052580: PCT Application filed Sep. 24, 2020, 58 pages, Doc 1224.
PCT Application No. PCT/US2020/052580: Intl Search Report and Written Opinion dated Dec. 8, 2020, 16 pages, Doc 1225.
PCT Application No. PCT/US2020/052580: Article 34 Amendment filed Mar. 5, 2021, 20 pages, Doc 1226.
PCT Application No. PCT/US2020/052580: Intl Preliminary Report on Patentability dated Jan. 19, 2022, 20 pages, Doc 1227.
U.S. Appl. No. 15/470,522, filed Mar. 27, 2017, 48 pages, Doc 1228A and 1228B.
U.S. Appl. No. 15/470,522: Preliminary Amendment filed Mar. 30, 2017, 8 pages, Doc 1229.
U.S. Appl. No. 15/470,522: Filing Receipt and Notice to File Corrected Application Papers dated Apr. 4, 2017, 5 pages, Doc 1230.
U.S. Appl. No. 15/470,522: Amendment and Response to Notice to File Corrected Application Papers filed Apr. 18, 2017, 53 pages, Doc 1231A and 1231B.
U.S. Appl. No. 15/470,522: Updated Filing Receipt dated Apr. 18, 2017, 3 pages, Doc 1232.
U.S. Appl. No. 15/470,522: Restriction Requirement dated Feb. 4, 2019, 8 pages, Doc 1234.
U.S. Appl. No. 15/470,522: Amendment and Response to Restriction Requirement filed Apr. 1, 2019, 12 pages, Doc 1235.
U.S. Appl. No. 15/470,522: Non-final Office Action dated May 16, 2019, 26 pages, Doc 1236.
U.S. Appl. No. 15/470,522: Amendment filed Aug. 1, 2019, 12 pages, Doc 1237.
U.S. Appl. No. 15/470,522: Notice of Allowance dated Dec. 30, 2019, 8 pages, Doc 1238.
U.S. Appl. No. 15/470,522: Issue Fee Payment filed Dec. 30, 2019, 5 pages, Doc 1239.
U.S. Appl. No. 15/470,522: Issue Notification dated Jan. 15, 2020, 1 page, Doc 1240.
U.S. Appl. No. 16/730,878, filed Dec. 30, 2019, 49 pages, Doc 1241.
U.S. Appl. No. 16/730,878: Filing Receipt and Notice to File Corrected Application Papers dated Jan. 24, 2020, 6 pages, Doc 1242.
U.S. Appl. No. 16/730,878: Amendment and Response to Notice to File Corrected Application Papers filed Mar. 24, 2020, 39 pages, Doc 1243.
U.S. Appl. No. 16/730,878: Updated Filing Receipt dated Mar. 26, 2020, 4 pages, Doc 1244.
U.S. Appl. No. 16/730,878: Notice of Publication dated Jul. 6, 2020, 1 page, Doc 1245.
U.S. Appl. No. 16/730,878: Request for Corrected Filing Receipt dated Jul. 9, 2020, 1 page, Doc 1246.
U.S. Appl. No. 16/730,878: Corrected Filing Receipt dated Jul. 13, 2020, 4 pages, Doc 1247.
U.S. Appl. No. 12/938,245, filed Nov. 2, 2010, 24 pages, Doc 1248.
U.S. Appl. No. 12/938,245: Filing Receipt dated Nov. 17, 2020, 3 pages, Doc 1249.
U.S. Appl. No. 12/938,245: Preliminary Amendment filed Jan. 10, 2012, 17 pages, Doc 1251.
U.S. Appl. No. 12/938,245: Examiner Initiated Interview Summary and Notice of Allowance dated Jun. 18, 2012, 22 pages, Doc 1252.
U.S. Appl. No. 12/938,245: Issue Fee Payment filed Nov. 8, 2012, 1 page, Doc 1253A-D.
U.S. Appl. No. 12/938,245: Issue Notification dated Dec. 5, 2012, 1 page, Doc 1254.
U.S. Appl. No. 13/669,123, filed Nov. 5, 2012, 83 pages, Doc 1255.
U.S. Appl. No. 13/669,123: Filing Receipt and Notice to File Corrected Application Papers dated Dec. 4, 2012, 5 pages, Doc 1256.
U.S. Appl. No. 13/669,123: Amendment and Response to Notice to File Corrected Application Papers filed Jan. 8, 2013, 4 pages, Doc 1257.
U.S. Appl. No. 13/669,123: Updated Filing Receipt dated Aug. 12, 2013, 3 pages, Doc 1258.
U.S. Appl. No. 13/669,123: Notice of Allowance dated Sep. 11, 2013, 10 pages, Doc 1259.
U.S. Appl. No. 13/669,123: Issue Fee Payment filed Oct. 14, 2013, 2 pages, Doc 1260.
U.S. Appl. No. 13/669,123: Issue Notification dated Oct. 30, 2013, 1 page, Doc 1261.
U.S. Appl. No. 13/736,944, filed Jan. 9, 2013, 17 pages, Doc 1262.
U.S. Appl. No. 13/736,944: Filing Receipt dated Feb. 6, 2014, 3 pages, Doc 1263.
U.S. Appl. No. 13/736,944: Non-final Office Action dated May 4, 2013, 16 pages, Doc 1264.
U.S. Appl. No. 13/736,944: Response to Non-final Office Action filed Dec. 9, 2015, 12 pages, Doc 1265.
U.S. Appl. No. 13/736,944: Final Office Action dated Oct. 6, 2016, 18 pages, Doc 1266.
U.S. Appl. No. 13/736,944: Request for Continued Examination and Amendment filed Apr. 4, 2017, 14 pages, Doc 1267.
U.S. Appl. No. 13/736,944: Advisory Action dated Apr. 28, 2017, 4 pages, Doc 1268.
U.S. Appl. No. 13/736,944: Request for Continued Examination filed May 1, 2017, 6 pages, Doc 1269.
U.S. Appl. No. 13/736,944: Corrected Filing Receipt dated May 4, 2017, 3 pages, Doc 1270.
U.S. Appl. No. 13/736,944: Replacement Filing Receipt dated May 26, 2017, 3 pages, Doc 1271.
U.S. Appl. No. 13/736,944: Non-final Office Action dated Mar. 21, 2018, 47 pages, Doc 1272A and 1272B.
U.S. Appl. No. 13/736,944: Amendment and Terminal Disclaimer filed Jun. 21, 2018, 42 pages, Doc 1273.
U.S. Appl. No. 13/736,944: Final Office Action dated Oct. 18, 2018, 37 pages, Doc 1274.
U.S. Appl. No. 13/736,944: Response to Final Office Action filed Dec. 17, 2018, 15 pages, Doc 1275.
U.S. Appl. No. 13/736,944: Advisory Action dated Jan. 14, 2019, 6 pages, Doc 1276.
U.S. Appl. No. 13/736,944: Notice of Appeal filed Jan. 17, 2019, 4 pages, Doc 1277.
U.S. Appl. No. 13/736,944: Appeal Brief filed Mar. 18, 2019, 20 pages, Doc 1278.

(56) References Cited

OTHER PUBLICATIONS

U.S. Appl. No. 13/736,944: Notice of Allowance dated Jul. 8, 2019, 19 pages, Doc 1279.
U.S. Appl. No. 13/736,944: Issue Fee Payment filed Oct. 3, 2019, 4 pages, Doc 1280.
U.S. Appl. No. 13/736,944: Issue Notification dated Feb. 19, 2020, 1 page, Doc 1281.
U.S. Appl. No. 15/422,137, filed Feb. 1, 2017, 46 pages, Doc 1282A and 1282B.
U.S. Appl. No. 15/422,137: Filing Receipt and Notice to File Missing Parts dated Feb. 13, 2017, 7 pages, Doc 1283.
U.S. Appl. No. 15/422,137: Response to Notice to File Missing Parts filed Apr. 11, 2017, 6 pages, Doc 1284.
U.S. Appl. No. 15/422,137: Updated Filing Receipt dated Apr. 14, 2017, 4 pages, Doc 1285.
U.S. Appl. No. 15/422,137: Notice of Publication dated May 25, 2017, 1 page, Doc 1312.
U.S. Appl. No. 15/422,137: Non-final Office Action dated Sep. 20, 2018, 28 pages, Doc 1286.
U.S. Appl. No. 15/422,137: Response to Non-final Office Action filed Dec. 19, 2018, 17 pages, Doc 1313.
U.S. Appl. No. 15/422,137: Applicant Initialed Interview Summary dated Dec. 21, 2018. 4 pages, Doc 1314.
U.S. Appl. No. 15/422,137: Non-final Office Action dated Apr. 11, 2019, 28 pages, Doc 1315.
U.S. Appl. No. 15/422,137: Response to Non-final Office Action filed Jul. 9, 2019, 15 pages, Doc 1316.
U.S. Appl. No. 15/422,137: Notice of Allowance dated Oct. 25, 2019, 20 pages, Doc 1317.
U.S. Appl. No. 15/422,137: Issue Fee Payment filed Jan. 21, 2020, 3 pages, Doc 1318.
U.S. Appl. No. 15/422,137: Issue Notification dated Feb. 12, 2020, 1 page, Doc 1319.
U.S. Appl. No. 16/790,394, filed Feb. 13, 2020, 43 pages, Doc 1300.
U.S. Appl. No. 16/790,394: Filing Receipt and Notice of Missing Parts dated Mar. 3, 2020, 6 pages, Doc 1301.
U.S. Appl. No. 16/790,394: Preliminary Amendment and Response to Notice of Missing Parts filed May 29, 2020, 13 pages, Doc 1302.
U.S. Appl. No. 16/790,394: Updated Filing Receipt dated Jun. 4, 2020, 4 pages, Doc 1303.
U.S. Appl. No. 16/790,394: Request for Corrected Filing Receipt filed Jul. 17, 2020, 1 pages, Doc 1304.
U.S. Appl. No. 16/790,394: Corrected Filing Receipt dated Jul. 21, 2020, 4 pages, Doc 1305.
U.S. Appl. No. 16/790,394: Notice of Publication dated Sep. 10, 2020, 1 page, Doc 1306.
U.S. Appl. No. 16/790,394: Non-final Office Action dated May 17, 2021, 26 pages, Doc 1307.
U.S. Appl. No. 16/790,394: Amendment and Terminal Disclaimer filed Aug. 10, 2021, 22 pages, Doc 1308.
U.S. Appl. No. 16/790,394: Office Action dated Nov. 18, 2021, 31 pages, Doc 1309.
U.S. Appl. No. 16/790,394: Response to Office Action filed Feb. 18, 2022, 16 pages, Doc 1310.
U.S. Appl. No. 16/790,394: Final Office Action dated Apr. 13, 2022, 33 pages, Doc 1311.
PCT Application PCT/US2021/065112: PCT Application filed Dec. 23, 2021, 67 pages, Doc 1291.
U.S. Appl. No. 17/565,427, filed Dec. 29, 2021, 85 pages. Doc 1292.
U.S. Appl. No. 17/565,427: Filing Receipt dated Jan. 13, 2022, 5 pages, Doc 1293.
U.S. Appl. No. 17/565,427: Notice of Missing Parts dated Jan. 13, 2022, 2 pages, Doc 1294.
U.S. Appl. No. 17/565,427: Response to Notice of Missing Parts filed Mar. 11, 2022, 9 pages, Doc 1295.
PCT Application PCT/US21/65799: PCT Application filed Dec. 30, 2021, 80 pages, Doc 1296.
U.S. Appl. No. 17/246,471, filed Apr. 30, 2021, 73 pages, Doc 1297.
U.S. Appl. No. 17/246,471: Filing Receipt dated May 11, 2021, 4 pages, Doc 1298.
PCT Application PCT/US22/26637: PCT Application filed Apr. 28, 2022, 63 pages, Doc 1299.
U.S. Appl. No. 16/730,878: Final Office Action dated Mar. 28, 2023, 22 pages, Doc 1889.
U.S. Appl. No. 17/246,471: Non-Final Office Action dated Apr. 13, 2023, 48 pages, Doc 1890.
U.S. Appl. No. 18/076,074: Filing Receipt & Miscellaneous Communication to Applicant dated Dec. 23, 2022, 4 pages, Doc 1891.
PCT Application No. PCT/US2022/052028: Intl Search Report and Written Opinion dated Apr. 13, 2023, 24 pages, Doc 1894.
U.S. Appl. No. 18/185,605, filed Mar. 17, 2023, 59 pages, Doc 1892.

* cited by examiner

500

600

AUTHENTICATED COMMUNICATIONS DEVICE TO TIE REAL-WORLD AND DIGITAL IDENTITIES

CROSS-REFERENCE TO RELATED APPLICATIONS

This application claims priority to U.S. provisional patent application Ser. No. 63/130,309, filed Dec. 23, 2020, which is incorporated by reference in its entirety and for all purposes.

BACKGROUND

1. Field

The present disclosure relates generally to electronic communication infrastructures and, more particularly, to identifying a tie between an individual's digital identity, within the electronic and/or communications infrastructure, and the individual's real-life or actual identity.

2. Information

The World Wide Web or simply the Web, as enabled by Internet computing, routing, and/or wireless transmission resources, has grown rapidly in recent years at least partially in response to the relative ease with which a wide variety of transactions can be performed or enabled via the Internet. As a consequence of widely available Internet connections, including connections to the Internet facilitated by wireless mobile communication services, for example, a mobile subscriber may shop and/or purchase virtually any product or service utilizing a handheld communications device. However, in such an environment, in which electronic, Internet-based commerce has become increasingly common, occurrences of fraud and deception, unfortunately, can also occur.

In addition to facilitating communications among devices having a primary purpose that relates to providing communication services, such as mobile cellular communications devices, the Web also facilitates communication among devices providing other functionalities, such as appliances, industrial, commercial, and household machines, control devices, sensors, etc. In such environments, which include an "Internet of things" (IOT) environment, as well as environments involving devices designed primarily for communications, instances of fraud and deception may bring theft of financial assets, intrusion by unauthorized parties into a user's home network, theft of privileged content, financial and/or credit fraud, and so forth. To reduce a likelihood of fraud, theft, or intrusion by unauthorized parties, fraud-detection and/or user authentication processes may be implemented. Thus, it may be appreciated that reduction in the instances of fraud and deception, which may involve, for example, use of various types of communications devices, continues to be an active area of investigation.

SUMMARY

One general aspect of the disclosure includes a method, which includes accessing a data store to determine that signal packets have been received, via an electronic communications network, from a communications device that is to be verified, wherein the communications device is co-located with a real-world identity. The method also includes electronically determining that a subscriber account identifier or a subscriber-unique alias is bound to an account held by the real-world identity. The method also includes electronically tying the subscriber account identifier or the subscriber-unique alias to the real-world identity responsive to electronically verifying the communications device after determining that the signal packets have been received from the communications device, and electronically determining that the subscriber account identifier or the subscriber-unique alias is bound to the account held by the real-world identity.

In particular embodiments, the subscriber account identifier or the subscriber-unique alias is de-identified from parameters of the real-world identity. In particular embodiments, verifying of the communications device is performed via determining a reputation of the communications device. In particular embodiments, accessing the data store includes detecting one or more deterministic events with respect to the communications device. In particular embodiments, accessing the data store additionally includes detecting the one or more deterministic events in relation to historical norms regarding behavior of the real-world identity with respect to the communications device. In particular embodiments, the one or more deterministic events corresponds to an online behavior or an off-line behavior. In particular embodiments, the one or more deterministic events corresponds to an online behavior including one or more of a porting of a subscriber identifier from a first communication services carrier to a second communication services carrier, a purchase or replacement of the communications device with a previously unused communications device, a removal and/or replacement of a subscriber identity module, or a password reset of the communications device. In particular embodiments, the one or more deterministic events corresponds to an online behavior. In particular embodiments, the method further includes electronically determining that the communications device has connected to a particular uniform resource locator. In particular embodiments, the method includes initiating a comparison between a parameter provided by the real-world identity and a parameter accessed from the data store. In particular embodiments, the initiating follows receiving a response to a request from the communications device to authenticate the real-world identity. In particular embodiments, responsive to electronically tying the subscriber account identifier or the subscriber-unique alias to the real-world identity, the method includes establishing one or more additional ties between the real-world identity co-located with the communications device and a corresponding one or more logical entities. In particular embodiments, the one or more logical entities include one or more email addresses, one or more Internet protocol (IP) addresses, one or more additional communication devices, one or more streaming devices, one or more social network identifiers, one or more account numbers of one or more financial institutions, or any combination thereof. In particular embodiments, the method may further include, responsive to establishing the one or more additional ties, establishing one or more additional ties between the real-world identity co-located with the communications device and a corresponding one or more legal entities. In particular embodiments, the one or more legal entities include one or more of a driver's license number, a passport number, or a legal address. In particular embodiments, the method may additionally include accessing biometric parameters from a communications device corresponding to the subscriber account identifier or the subscriber-unique alias.

Another general aspect includes an apparatus, which includes at least one processor coupled to at least one memory device to access a data store to determine that signal packets have been received, via an electronic communications network, from a communications device that is co-located with a real-world identity, to electronically determine that a subscriber account identifier or a subscriber-unique alias is bound to an account held by the real-world identity, and to electronically tie the subscriber account identifier or the subscriber-unique alias to the real-world identity responsive to an electronic verification of the communications device after a determination that the signal packets have been received from the communication device, and an electronic determination that the subscriber account identifier or the subscriber-unique alias is bound to the account held by the real-world identity.

In particular embodiments, the communications device co-located with the real-world identity is to be verified via an electronic determination of a reputation of the communications device. In particular embodiments, the at least one processor coupled to the at least one memory to access the data store are additionally to detect one or more deterministic events with respect to the communications device. In particular embodiments, the one or more deterministic events are to be compared with historical norms regarding behavior of the real-world identity with respect to the communications device. In particular embodiments, the one or more deterministic events corresponds to an online behavior or to an off-line behavior. In particular embodiments, the at least one processor coupled to the at least one memory device are additionally to access biometric parameters from a communications device to correspond to the subscriber account identifier or the subscriber-unique alias. In particular embodiments, the at least one processor coupled to the at least one memory device are additionally to, responsive to the electronic tie of the subscriber account identifier or the subscriber-unique alias to the real-world identity, establish one or more additional ties between the real-world identity co-located with the communications device and a corresponding one or more logical entities, the one or more logical entities to include one or more email addresses, one or more IP addresses, one or more additional communication devices, one or more streaming devices, one or more social network identifiers, one or more account numbers of one or more financial institutions, or any combination thereof.

Another general aspect includes an article, which includes a non-transitory storage medium having instructions stored thereon which, when executed by a special-purpose computing platform having a processor coupled to at least one memory are operable to access a data store to determine that signal packets have been received, via an electronic communications network, from a communications device that is to be verified, the communications device being co-located with a real-world identity, to electronically determine that a subscriber account identifier or a subscriber-unique alias is bound to an account held by the real-world identity, and to electronically tie the subscriber account identifier or the subscriber-unique alias to the real-world identity responsive to an electronic verification of the communications device after a determination that the signal packets have been received from the communication device and an electronic determination that the subscriber account identifier or the subscriber-unique alias is bound to the account held by the real-world identity.

In particular embodiments, the stored instructions are additionally operable to initiate a comparison between a parameter provided by the real-world identity and a parameter accessed from the data store, wherein comparison is to be initiated after receiving a response to a request from the communications device to authenticate the real-world identity. In particular embodiments, the stored instructions are additionally operable to, responsive to the electronic tying of the subscriber account identifier or the subscriber-unique alias to the real-world identity, establish one or more additional ties between the real-world identity co-located with the communications device and a corresponding one or more logical entities. In particular embodiments, the one or more logical entities include one or more email addresses, one or more IP addresses, one or more additional communication devices, one or more streaming devices, one or more social network identifiers, one or more account numbers of one or more financial institutions, or any combination thereof. In particular embodiments, the stored instructions are additionally operable to, responsive to establishing the one or more additional ties, establish one or more additional ties between the real-world identity co-located with the communications device and a corresponding one or more legal entities. In particular embodiments, the one or more legal entities include one or more of a driver's license number, a passport number, and a legal address. In particular embodiments, the stored instructions are additionally operable to access to metric parameters from a communications device corresponding to the subscriber account identifier or the subscriber-unique alias.

Another general aspect includes a method to establish a tie between a communications device and a real-world identity, including electronically determining proof of possession of the communications device by the real-world identity, electronically determining that the communications device is bound to a specific digital account and electronically determining a reputation of the communications device based on events with respect to the communications device bound to the specific digital account.

In particular embodiments, electronically determining proof of possession of the mobile device includes verifying a subscriber account identifier or a subscriber-unique alias corresponding to the specific digital account. In particular embodiments, the subscriber account identifier or the subscriber-unique alias corresponds to the mobile telephone number of the communications device. In particular embodiments, the subscriber account identifier or the subscriber-unique alias excludes personally identifiable information. In particular embodiments electronically determining proof of possession of the communications device by the real-world identity is based, at least in part, on the reputation of the communications device. In particular embodiments, the reputation of the communications device is determined in view of one or more deterministic events with respect to the communications device. In particular embodiments, the one or more deterministic events comprises an online event. In particular embodiments, the online event comprises one or more of a reassignment of a subscriber account identifier from a first communication services carrier to a second communication services carrier, a purchase or replacement of the communications device with a previously unused communications device, a removal and/or replacement of a subscriber identity module (SIM), and a password reset of the communications device.

In particular embodiments, determining proof of possession of the communications device comprises electronically determining that the communications device has connected to a particular uniform resource locator (URL). In particular embodiments, determining proof of possession of the communications device includes entering, via the user interface, a parameter previously transmitted to the communications device. In particular embodiments, determining proof of possession of the communications device comprises the communications device transmitting a subscriber account identifier or a subscriber-unique alias to an identity verifier.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
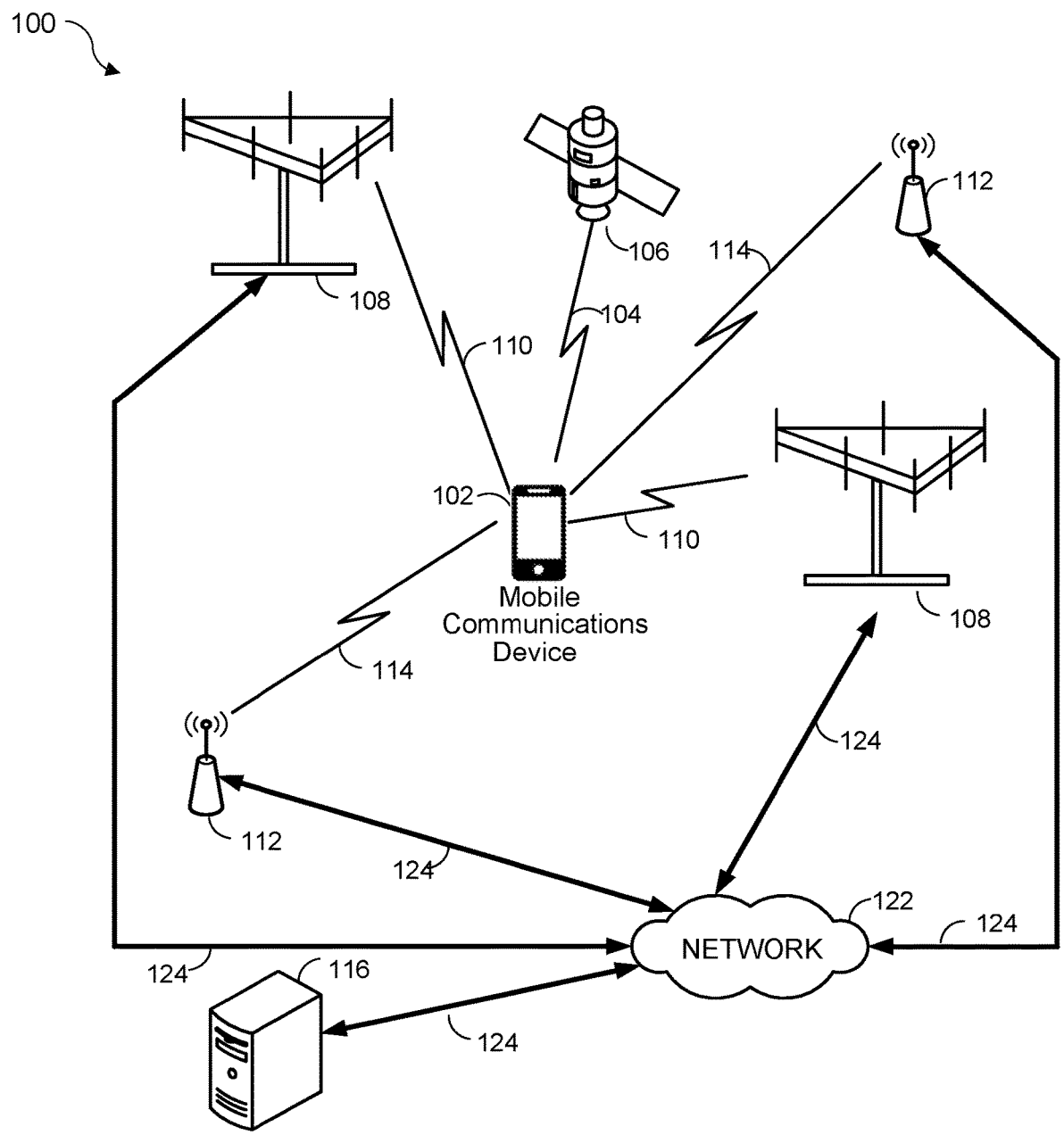
FIG. 1 is a schematic diagram illustrating features associated with an implementation of an example communications infrastructure, which may facilitate an identity verification platform to establish a tie between a subscriber's real-world and electronic or digital identity, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, or the like described are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for implementing an identity verification platform, such as via one or more computing and/or communication networks and/or protocols (e.g., network protocols) discussed herein. As will be seen, in some instances, operations and/or techniques for implementing an identity verification platform, may be implemented, at least in part, to authenticate and/or verify an identity and/or trustworthiness of a subscriber having an account, for example, with a mobile communication services provider.

In this context, an "account," such as described hereinabove, may represent an aspect of an individual's presence in an electronic or digital domain. Accordingly, in a manner similar to the manner in which a real-world individual may possess particular physical aspects, such as biometric aspects, which may include height, weight, hair color, eye color, parameters extracted from an image of a subscriber's face (e.g., so as to facilitate facial recognition), a unique fingerprint or thumbprint, a unique walking stride or gait, a subscriber may possess aspects in an electronic or digital domain. For example, in an electronic or digital domain, a subscriber may possess aspects such as a subscriber account identifier or a subscriber-unique alias, a mobile subscriber identifier (e.g., mobile or landline telephone number), one or more email addresses, one or more bank account numbers, one or more brokerage account numbers, a Social Security numbers, a username and password to obtain restricted or premium content, one or more numbers to identify the subscriber to a healthcare provider, etc.

Also as discussed below, one or more operations and/or techniques for implementing an identity verification platform within an electronic communications infrastructure may allow a particular institution or organization, such as a bank, to verify identity and/or trustworthiness of a user. Such verification may be achieved by utilizing sensitive content or data held by a particular data source, such as a mobile communication services carrier, a communications device (e.g., a mobile cellular telephone, and IOT device, a laptop computer, or the like). In addition, such identity verification may be achieved via accessing a data source containing subscriber-specific parameters such as names, physical addresses, employers, and a host of additional parameters. In this context, a "data source" refers to a source of sensitive content (e.g., private consumer content, personally identifiable information, fee-based entertainment content, etc.) that is accepted as being accurate and/or authoritative. At times, a data source may be incentivized (e.g., via consumer privacy laws, etc.) to restrict access of sensitive content, such as private consumer content, to parties outside of their immediate control. Such access restrictions may be imposed for legal and/or regulatory reasons, contractual obligations, or for other reasons, and claimed subject matter is not limited in this respect. For example, a data source may restrict access to sensitive content by identity verifiers since the data source may lack trust in the ability of the identity verifier to maintain confidentiality under all circumstances. In this context, the term or terms "identity verifier" or "verifier" refer to an entity facilitating and/or supporting identity verification of a user. In some instances, an identity verifier may include, for example, a mobile communication services carrier, aggregator of mobile subscriber accounts, or any other verification service (e.g., third-party, etc.).

"Content," "sensitive content," "data," "electronic content," or "private consumer content," as these terms are used herein, should be interpreted broadly and refer to signals, which may be organized into signal packets, for example, and/or states, such as physical states on a memory device, for example. Such terms are to be employed in a manner irrespective of format, such as by way of any expression, representation, realization, and/or communication, for example. Sensitive content, such as private consumer content, may comprise, for example, any information, knowledge, and/or experience, such as, again, in the form of signals and/or states, physical or otherwise. In this context, "electronic" or "online" content refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, multimedia, or the like. Thus, sensitive content, such as private consumer content, may be stored and/or transmitted digitally or electronically, such as before or after being perceived by human senses. In general, it may be understood that sensitive content in an electronic form may be intended to be referenced in a particular discussion, although in the particular context, the term "content" may be employed for ease of discussion. Specific examples of content may include, for example, computer code, metadata, messages, text, audio file, video file, data file, web page, multimedia files, or the like and claimed subject matter is not limited in this respect.

As alluded to previously, in a society in which electronic commerce, facilitated via communications devices, takes place on a grand scale, occurrences of fraud, unfortunately, are increasing in frequency. To reduce instances of potential fraud in connection with certain types of transactions (e.g., financial transactions) various processes and/or procedures have been developed. Processes and/or procedures may extend to other types of online transactions and/or in-store purchases, which may include goods and/or services, just to name a few illustrative examples. Further, in a world in which various electronic devices typically used for communication, such as mobile cellular telephones, tablets, laptop computers, etc., are ubiquitous, the types of possible fraud have, in at least some instances, become more complex. Occurrences of fraud may involve the use and/or knowledge of complex technology, for example, which may be related to the particular hardware and/or software platforms associated with such cellular telephones, IOT devices tablet computing devices, laptop computers, etc. Thus, a need for ways to reduce the risk of fraud, including fraud that may occur online and/or electronically, continues to be an active area of investigation.

One approach toward reducing the risk of potential fraud relates to identity authentication and/or verification of a user, customer, subscriber, or purchaser, typically before completing a transaction (e.g., in place of or in addition to) a typical log-in. In this context, the term "transaction" (or similar term) refers to a set of communications and/or actions, which take place between at least two parties that reciprocally affect and/or influence the parties involved in the transaction. Entities that provide identity verification services are referred to herein are as identity verifiers, authenticators, or similar terms. These terms are intended to encompass agents of identity verification and/or authorization that may otherwise exist as separate entities. For example, an agent may include an entity that facilitates and/or supports a particular service, such as an identity verification service, via organizing and/or participating in one or more transactions between two other parties (e.g., a bank and a carrier, etc.). In this context, it is to be understood that identity verification and/or authentication may be requested for a significant number of users for corresponding number of possible situations. For example, millions, tens of millions, hundreds of millions or even more requests may be submitted on a daily basis, for example. Therefore, consistent and workable approaches and/or processes, rather than uniquely customized approaches and/or processes that may otherwise vary by request, may be desired with a large volume of requests.

As will be discussed, identity verification is one possible approach to reduce the risk of fraud. Other approaches or portions thereof, such as authentication and/or verification or the like may also be used herein, in whole or in part, such as part of, in addition to, and/or in conjunction with identity verification. With respect to identity verification, in a worldwide electronic communications environment, a subscriber to a mobile communications service carrier may establish an identity with such a carrier and/or with a third party. Such third parties may include, but are not limited to, an online merchant, who may be willing to interact with a user (e.g., customer, subscriber, purchaser, etc. to sell, extend services, provide access to content, etc.) if the identity of such a subscriber can be verified. In many instances, given the nature of certain transactions, especially in a communications environment in which transactions may take place via a communications network that operates around the clock and at remote locations, it may be useful to perform identity verification quickly, such as in a real-time or near-real-time fashion.

As a general matter, authentication and/or verification of a mobile subscriber, may be desirable if an institution or organization (e.g., third party, etc.) wishes to verify the identity of a user (e.g., mobile subscriber). Identity verification typically relies on authenticating or verifying an existing bind and/or association to a persistent mobile identifier, as demonstrated below through illustrative examples. In this context, the term "bind," "association," or similar terms, refers to a persistent, continuing and objectively verifiable relationship between a user/subscriber (e.g., person, entity, etc.) and a mobile identity, including, as an example, a mobile subscriber and a bank or other financial institution or organization holding his or her bank account. Thus, a subscriber account identifier, may be employed to represent a mobile identity.

At a level higher than the subscriber account identifier, subscriber account identifier or a subscriber-unique alias may be utilized to represent the mobile identity. In particular embodiments, use of a subscriber account identifier or a subscriber-unique alias may operate to identify a particular subscriber, who may own a number of communications devices (e.g., a work-related cellular communications device, a personal cellular communications device, a company-owned laptop computer, a personal laptop computer, etc.). Thus, it may be appreciated that use of a subscriber account identifier or a subscriber-unique alias may be utilized to identify a subscriber in a manner that is at least somewhat detached from the subscriber's various account-holding relationships with communication services providers. In such instances, a subscriber account identifier or a subscriber-unique alias may be utilized in place of a host of subscriber account identifiers, each of which maps to a single communication services provider.

In particular embodiments, a subscriber account identifier or a subscriber-unique alias may exclude (or may be "de-identified" with) any portion of a real-world identity. Thus, in this context, the term "de-identified" refers to the impossibility, or the virtual impossibility, of determining, such as via a subscriber account identifier or a subscriber-unique alias, the actual real-world identity of the subscriber assigned or having the subscriber account identifier or the subscriber-unique alias. In particular embodiments, pseudonymization may be utilized in a de-identification procedure by which personally-identifiable information fields within a record are replaced by one or more artificial identifiers, or pseudonyms. A single pseudonym for each replaced field or collection of replaced fields may render each field of the record less identifiable while remaining suitable for data analysis and data processing.

The term mobile subscriber-unique alias, subscriber account identity, and/or similar terms in this context refer to identities that rely, at least in part, on a mobile account relationship (also referred to as a bind and/or association) of a user as a source of verification and is capable of being verified by another (e.g., a third-party identity verifier). The term mobile account and/or similar terms in this context refer to a mobile service provider account. Likewise, the terms "communication services carrier" and "mobile subscriber network operator" may be used interchangeably. Furthermore, in this context, the term wireless carrier, common carrier, or simply carrier refers to an entity in telecommunications that provides wired and/or wireless communication services to the general public for a fee. Thus, while a carrier may comprise a mobile communication services provider and/or mobile network operator; there are examples of carriers that are not mobile service providers and/or mobile network operators. Nonetheless, the term "carrier may be used in place of mobile service provider and/or mobile network operate without a loss in meaning and/or understanding. In any given situation, particular context of usage should indicate if carrier is being used in its most general sense or in a narrow sense, such as referring to a mobile service provider and/or mobile network operator, for example.

Aspects of subscriber authentication and/or verification and/or verification are described herein. As noted, in an embodiment, verification, such as mobile subscriber identity verification and verification of a subscriber account identifier or a subscriber-unique alias, may relate to a mobile account and/or a mobile subscriber, for example. As mentioned, a mobile account is one example of a type of account, especially in an online world, although claimed subject matter is not intended to be limited to online accounts or mobile accounts. Rather, the term "account" in this context refers to a formal business arrangement between an entity and/or person and a provider of the account in order to accomplish a business purpose. It is noted, for clarification, that in some situations, a person may represent an entity, for example. Likewise, in some situations, a person and an entity may be distinct. Further, the term account is to be read broadly and may include a service account, a financial account, an account relating to access to content, as just a few illustrative examples. Thus, continuing with non-limiting examples, an account, in various embodiments, may, for example, be employed with respect to purchase of goods and/or services, access to content, access to financial accounts, access to medical records, access to corporate or organizational intellectual property and/or other types of records and/or files, access to other services, etc.

Likewise, an account may include attributes associated with or corresponding to the account. In this context, the term "subscriber account identifier" refers to a unique descriptor or feature associated with the account that at least partially defines certain aspects of the account. For example, as nonlimiting illustrations, with respect to a mobile device user, a subscriber account identifier may refer to a mobile telephone number, a mobile subscriber identifier or a mobile subscriber-unique alias, an international mobile subscriber identifier (IMSI), Integrated Circuit Card Identifier (ICC ID), and/or other type of identifier (e.g., a unique identifier) employed in connection with the particular mobile network operator or the mobile communication services provider. Mobile communications networks may include those compatible or compliant with a Global System for Mobile Communications (GSM) telecommunications network, for example. Other examples of mobile subscriber account identifiers may include an international mobile equipment identifier (IMEI), a mobile equipment identifier or any other identifier a mobile billing account number/identifier. At a level higher than a subscriber account identifier, a subscriber-unique alias, in this context, refers to one or more subscriber account identifiers, wherein each subscriber account identifier may represent a subscriber relationship with an individual communication services carrier.

Although the discussion that follows relates to any type of account, as a non-limiting illustration, mobile accounts are used for illustration. It is understood, of course, that claimed subject matter is intended to not be limited to examples provided primarily for purposes of illustration, since such examples may be oversimplified for purposes of comprehension, for example. As was mentioned previously, with respect to commerce, including, of course, mobile accounts, a risk of fraud and/or unauthorized actions taking place is present or at least a risk exists of attempts being made.

The following provides a few illustrative examples of accounts in which a risk of fraud and/or unauthorized actions may be present. In scenarios, a subscriber may log into a bank account via a web browser or an executable application on a mobile device, for example. In response to receipt of signals initiated by a subscriber, a financial institution, for example, may utilize an application programming interface (API) substantially compatible and/or substantially compliant with HTTP and/or HTTPS, including versions now known and/or to be later developed, and/or another suitable protocol (e.g., now known and/or to later be developed). In such an example, a subscriber may seek to take one or more actions with respect to an account, for example, to transfer funds, view a history of transactions, make a payment, update sensitive content, etc. In another illustration, a subscriber may seek to access an existing account with a merchant. In response, a merchant, such as a provider of online music or other provider of entertainment-related content, may seek a form of payment, such as via a credit account (e.g., credit card) that may already be on record with the merchant. In another illustration, a subscriber may seek to access a mobile device, for example, to create, share, and/or edit a file.

Thus, as suggested, a subscriber may seek to access, for example, an online account. A third party, such as a party providing access to such an accounts, may seek to provide access control so as to restrict access to sensitive content. In an example, a software company and/or product, such as a developer of tax-preparation software products, may permit individual (access controlled) subscriber accounts to be established. In another instance, a subscriber may desire to access content, such as content corresponding to sensitive content (e.g., provided by a user to a social media account). In another instance, a subscriber may return to a website and/or application, in which access to the website could be dependent, at least partially, on binding a subscriber to a website and/or with an application, such as via an subscriber account identifier or a subscriber-unique alias corresponding to the particular subscriber. A third party may comprise a customer care facility of an enterprise, for example, such as a customer-care facility of a bank, in which an account is established.

As previously mentioned herein, authenticating and/or verifying a subscriber of a communications device may be instrumental in reducing the risk of fraudulent behavior, such as credit card fraud, wire fraud, bank fraud, and so forth. To increase the likelihood that a legitimate, bona fide mobile subscriber can complete a transaction (e.g., a financial transaction, a transaction to obtain fee-based content, or other type of transaction), an identity verifier may query one or more databases. Parameters obtained from the one or more databases may be utilized to complement parameters supplied by, for example, the mobile subscriber, and/or a communications device. In particular embodiments, a communications device may store physical parameters of a subscriber, such as subscriber-specific biometric aspects, which may include height, weight, hair color, eye color, parameters extracted from an image of a subscriber's face (e.g., so as to facilitate facial recognition), a unique fingerprint or thumbprint, a unique walking stride or gait, etc. Subscriber-specific physical parameters may be stored in a protected memory area of a subscriber's communications device, which may facilitate identification of the subscriber. Identity of a subscriber, obtained via accessing a protected area of the communications device may be utilized to generate a tokenized digital signature. In particular embodiments, a tokenized digital signature may facilitate completion of an authentication process initiated by an identity verifier in response to an authentication request generated by a merchant, financial institution, premium content provider, or the like.

It should be noted, however, that in many instances, databases utilized by identity verifiers and/or authenticators may be only partially complete. Accordingly, in some instances, authenticating and/or verifying identity of a mobile subscriber may be successful in only a limited number of circumstances. Such limited success in authenticating and/or verifying an identity of a mobile subscriber may be attributed, at least in part, to use of imprecise (e.g., "fuzzy") logic. Utilizing fuzzy logic, minor inconsistencies between subscriber parameters may be ignored, so long as, on balance, such subscriber parameters are likely to correspond to a particular subscriber. In one possible example just for the sake of illustration, a first individual named John Smith, living in New York City, may be confused with Jonathan Smith, living in a suburb of New York City. In another possible example, two or more parameters, considered in the aggregate, may bring about confusion and/or ambiguity in authentication and/or verification of an individual. For example, a first individual named John Smith, having a physical address in New York City, and having a Social Security number of 556-55-5555 may be confused with John Smyth, also having a physical address in New York City, and having a Social Security number of 555-55-5555. In such instances, wherein distinct individuals in the real world may be confused with one another, permitting such individuals to engage in transactions, such as financial transactions, may present an opportunity to engage in fraudulent behavior. For example, an unscrupulous individual, may attempt to impersonate another individual, such as by obtaining a phone number having digits that are similar to those of another individual, obtaining an electronic mail address that is similar to an electronic mail address of another individual, and so forth. In some instances, an unscrupulous individual may desire to modify one or more aspects of a particular mobile services account.

As mentioned previously, one way to mitigate the risk of fraud may be to employ authentication and/or verification, which may include mobile identity authentication or verification of trustworthiness of a mobile services subscriber. In particular embodiments, as will be described herein, an identity verification platform may permit an institution or organization, such as a financial institution, to verify identity and/or trustworthiness of a user by using sensitive content held by a particular data source. Authentication and/or verification of a mobile subscriber may operate to form a tie between a real-world identity of a mobile subscriber and an identity of the mobile subscriber in an electronic or digital domain. Such a tie may represent a relatively strong relationship between the identity of a real-world individual with the digital identity of such individual (in an electronic or digital domain).

Such a tie between a real-world individual and a digital identity of such individual in an electronic or digital domain may be relatively strong since many individuals find it difficult to participate in contemporary society in the absence of a communications device. For example, in many instances, a communications device provides not only voice/data communications capabilities, but may also provide location services, calendaring services, entertainment, gaming, as selected by the individual subscriber. Accordingly, in contrast to the loss of a particular credit card, for example, which may go unnoticed for a period of days, or even weeks, loss of a communications device may be noticed immediately, perhaps within minutes or even seconds of misplacement or loss of such communications device. Hence, it may be appreciated that if an individual misplaces a communications device, such an individual may rapidly attempt to recover the device, or may attempt to replace the device immediately.

Accordingly, a communications device may be instrumental in providing a tie between a real-world subscriber and a digital identity of a subscriber (e.g., in an electronic or digital domain). Further in view of the importance that many individuals place on personal communications devices, establishing a tie between an individual and such a communications device may provide a tie between the identity of a real-world individual and a digital identity of such individual. For example, in an electronic or digital domain, a subscriber account identifier (e.g., a mobile telephone number) may be tied to a particular email address, such as an email address to which invoices for mobile communication services may be conveyed. Accordingly, upon establishing a tie between a real-world individual and a digital identity, such as by way of tying a real-world mobile subscriber with a subscriber account number in an electronic or digital domain, additional aspects of the mobile subscriber's digital identity may be constructed. Thus, in one possible example, following the establishment of a tie between a real-world individual and a mobile subscriber account identifier as well as an email address, an Internet protocol (IP) address to which such emails may be delivered may also be ascertained. Thus, it may be appreciated that the tie between a real-world individual and a digital identity of such an individual may serve as a conduit, which can be exploited to form additional aspects the subscriber's digital identity. In particular embodiments, such exploitation of a conduit formed between an individual's real-world identity and the individual's digital identity, utilizing a subscriber account identifier (e.g., a mobile telephone number) may be facilitated utilizing an identity verification platform. In particular embodiments, an identity verification platform may operate within a communications infrastructure, such as shown in FIG. 1.

FIG. 1 is a schematic diagram illustrating features associated with an implementation of an example communications infrastructure, which may facilitate an identity verification platform to establish a tie between a subscriber's real-world and digital identity, according to an embodiment. Processes and/or operations for an identity verification platform may be implemented, at least in part, to validate identity of a mobile communication services subscriber utilizing a communications device (e.g., a mobile communications device) referenced herein at 102. As used herein, the term "communication device" may be used interchangeably and refer to any kind of special purpose computing platform and/or apparatus that may from time to time occupy a position or location that changes. As a way of illustration, communications devices may include, for example, cellular telephones, smart telephones, laptop computers, personal entertainment systems, tablet personal computers (PC), personal audio or video devices, personal navigation devices, Internet of Things (IoT) devices, or the like. Further, each communication device under the control of, or in possession of a particular subscriber, may utilize a protected area in memory, which may store physical parameters (e.g., biometric parameters) of a user. Thus, as previously mentioned hereinabove, responsive to a subscriber utilizing a particular communications device (e.g., such as a mobile cellular telephone) to purchase goods or services, biometric parameters of the subscriber may be accessed from the particular device (e.g., mobile cellular telephone, laptop, etc.), such as by a merchant, so as to enable the merchant to verify the identity of the subscriber. Thus, it may be appreciated that physical parameters of a subscriber, which may be stored via a communications device, may vary from device to device. Thus, for example, physical parameters (e.g., biometric parameters) of a subscriber stored on a mobile cellular telephone, may differ from physical parameters (e.g., biometric parameters) stored on the subscriber's laptop computer. For example, biometric parameters related to a communications device regularly carried on a subscriber's person (e.g., a mobile cellular telephone), may comprise parameters related to the subscriber's walking stride or gait. However, biometric parameters related to a communications device that is less often carried, or carried differently, by a subscriber (e.g., a laptop computer) may differ from biometric parameters related to a subscriber's mobile cellular telephone. It may be appreciated, therefore, that in verifying the identity of a subscriber initiating a transaction, a merchant, for example, may seek to obtain biometric parameters for the particular subscriber communications device utilized to engage in the transaction. In particular embodiments, to establish a tie between the subscriber's real-world and digital identity, a subscriber may be requested to enroll with an identity verification service, which may associate, for example, a subscriber account identifier or a subscriber-unique alias with a particular communications device.

It may be appreciated that communications infrastructure 100 is described herein as a non-limiting example that may be implemented, in whole or in part, in the context of various electronic communications networks or a combination of such networks, such as public networks (e.g., the Internet, the World Wide Web), private networks (e.g., intranets), WWAN, wireless local area networks (WLAN, etc.), or the like. It should also be noted that claimed subject matter is not limited to a particular network and/or operating environment. For example, in some instances, an optical network may be used herein, in whole or in part, such as separately and/or in any suitable combination with one or more networks discussed herein. Thus, depending on an implementation, one or more operations and/or techniques for implementing an identity verification platform.

As illustrated, in an implementation, communications device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, communications device 102 may, for example, transmit wireless signals to, or receive wireless signals from, a wireless communication network. In one example, communications device 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, communications device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. Similarly, local transceiver 112 may comprise, for example, a wireless transmitter and/or receiver capable of transmitting and/or receiving wireless signals. For example, as will be seen, at times, wireless transceiver 112 may be capable of obtaining one or more observations from one or more other terrestrial transmitters.

In a particular implementation, local transceiver 112 may communicate with communications device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). In another example implementation, local transceiver 112 may comprise a femtocell or picocell capable of facilitating communication via link 114 according to an applicable cellular or like wireless communication protocol. It should be understood that these are merely examples of networks that may communicate with communications device 102 over a wireless link, and claimed subject matter is not limited in this respect. For example, in some instances, communications infrastructure 100 may include a larger number of base station transceivers 108, local transceivers 112, etc.

In an implementation, base station transceiver 108 and local transceiver 112 may communicate with server 116 over a network 122 via one or more links 124. Network 122 may comprise, for example, combinations of wired or wireless communication links. In a particular implementation, network 122 may comprise, for example, a network capable of implementing an Internet Protocol (IP) infrastructure capable of facilitating or supporting communication between communications device 102 and server 116 via local transceiver 112, base station transceiver 108, etc. In another implementation, network 122 may comprise, for example cellular communication network infrastructure, such as a base station controller or master switching center to facilitate and/or support mobile cellular communication with communications device 102. Server 116 may comprise one or more database servers (e.g., for a data source, agent, identify verifier, carrier, etc.), update servers, back-end servers, management servers, archive servers, location servers, positioning assistance servers, navigation servers, map servers, crowdsourcing servers, network-related servers, or the like.

In particular implementations, communications device 102 may have circuitry and/or processing resources capable of determining a position fix or estimated location of communications device 102, initial (e.g., a priori) or otherwise. For example, if satellite signals 104 are available, communications device 102 may compute a position fix based, at least in part, on pseudo range measurements to four or more SPS satellites 106. Here, communications device 102 may compute such pseudorange measurements based, at least in part, on pseudonoise code phase detections in signals 104 acquired from four or more SPS satellites 106. In particular implementations, communications device 102 may receive from one or more of servers 116 positioning assistance data to aid in the acquisition of signals 104 transmitted by SPS satellites 106 including, for example, almanac, ephemeris data, Doppler search windows, just to name a few examples.

Even though a certain number of computing platforms and/or devices are illustrated herein, any number of suitable computing platforms and/or devices may be implemented to facilitate and/or support one or more techniques and/or processes associated with communications infrastructure 100. For example, at times, network 122 may be coupled to one or more wired or wireless communication networks (e.g., WLAN, etc.) so as to enhance a coverage area for communications with communications device 102, one or more base station transceivers 108, local transceiver 112, server 116, or the like. In some instances, network 122 may facilitate and/or support femtocell-based operative regions of coverage, for example. Again, these are merely example implementations, and claimed subject matter is not limited in this regard.

Thus, as was indicated, one or more operations and/or techniques for establishing a tie between the identity of a real-world individual with the digital identity of such individual (in an electronic or digital domain). Establishment of such a tie may allow an institution or organization (e.g., a financial institution, etc.) to authenticate and/or verify identity of, for example, a mobile subscriber. Such a tie may additionally permit assessment of the trustworthiness of a mobile subscriber utilizing records of deterministic events with respect to a communications device in possession of (or co-located with) a mobile subscriber. Such a tie between real-world and digital identities of a subscriber may operate to ensure that sensitive content does not become exposed to an unscrupulous individual.

Figure 2:
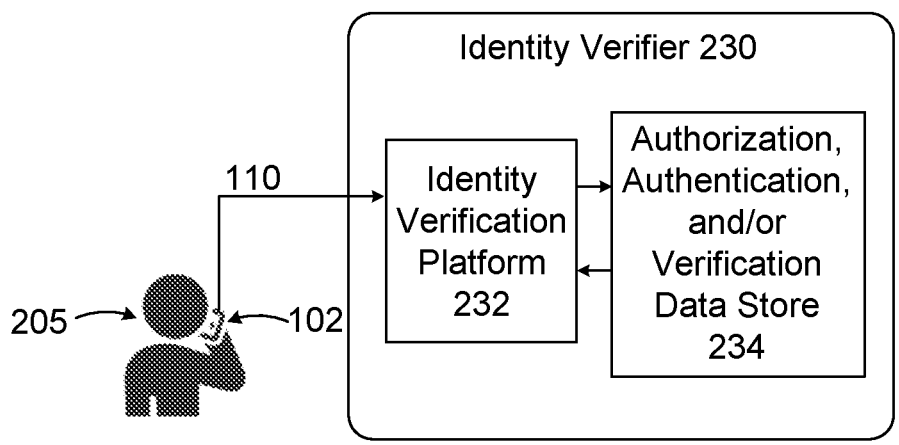
FIG. 2 is a schematic diagram of an implementation of an example use case for a mobile subscriber to interact with an identity verification platform, according to an embodiment.

Attention is now drawn to FIG. 2, which is a schematic diagram of an implementation of an example use case for a mobile subscriber to interact with an identity verification platform, according to an embodiment 200. In FIG. 2, mobile subscriber 205 is co-located with communications device 102. The embodiment of FIG. 2 may be implemented utilizing an identity verification platform (232), which may comprise a virtual or physical computing device or any combination thereof. Identity verification platform 232 may execute computer-readable instructions (e.g., software, firmware, etc.), so as to implement one or more operations and/or processes, as discussed herein. In embodiment 200, identity verification platform 232 may be deployed, such as being physically located, for example, so as to be directed by or under the control of identity verifier 230. Responsive to determining that mobile subscriber 205 has connected to a particular URL via communications device 102, identity verifier 230 may operate to establish a tie between individual mobile subscriber 205 and the digital identity of the subscriber. Such a tie may be established responsive to determining proof of possession of communications device 102 and determining that communications device 102 is bound to a specific digital account assigned to subscriber 205. Electronically determining that communications device 102 is bound to a specific digital account may involve the determination of a reputation of communications device 102. In particular embodiments, a communications device having a relatively strong or superior reputation may more concretely tie the communications device to a real-world identity. In particular embodiments, a communications device having a weak or inferior reputation may less concretely bind the communications device to a real-world identity.

Identity verifier 230 may implement one or more identity verification processes in real-time or in near-real-time. In this context, "real-time" refers to an amount of timeliness of content, which may be delayed by an amount of time attributable to electronic communications involving a communications network and/or signal processing of any received signals. It should be noted that information acquired or produced, for example, by input signals, output signals, operations, results, etc., associated with embodiment 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features. For example, in some instances, embodiment 200 may be implemented, in whole or in part, within the communications infrastructure of FIG. 1.

Thus, embodiment 200 may, for example, begin with a subscriber (205) of a mobile communication services carrier interacting with communications device 102. Communications device 102 may communicate with identity verifier 230 via communications link, such as link 110, perhaps through a cellular transceiver, such as base station transceiver 108 of FIG. 1. Identity verifier 230 may access subscriber parameters, such as a subscriber account identifier, subscriber name, and subscriber address, for example, from authentication, and/or verification data store 234. In some instances, identity verification platform 232 may provide exclusively, for example, a mobile telephone number received from communications device 102 via wireless communications link 110. In other embodiments, identity verification platform 232 may receive a subscriber account identifier or a subscriber-unique alias or a parameter other than a mobile telephone number, such as an international mobile subscriber identifier (IMSI), an international mobile electronic identifier (IMEI), or a mobile station international subscriber directory number (MSISDN), or any combination thereof. In turn, responsive to receipt of a subscriber account identifier or a subscriber-unique alias, an application program interface (API) of data store 234 may match a provided subscriber account identifier or a subscriber-unique alias with parameters of a particular subscriber, such as name, physical address, current employer, etc. perhaps by accessing internal carrier records, for example.

In the embodiment of FIG. 2, identity verifier 230 may determine or ascertain proof of possession of communications device 102 by subscriber 205. Thus, for example, identity verifier 230 may convey a text, or other type of short message to communications device 102, along with a prompt, which may request that mobile subscriber 205 enter the text or the type of short message into a user interface of communications device 102. As such, identity verifier 230 may verify that subscriber 205 is, indeed, in possession of communications device 102. Identity verifier 230 may additionally convey a second parameter to communications device 102, so as to determine if subscriber 205 possesses an account relationship with a mobile communication services carrier providing services to device 102. In one possible example, identity verifier 230 may request that a particular parameter not generally known to individuals other than mobile subscriber 205 be entered into a display of communications device 102. In a possible example, mobile subscriber 205 may be prompted to enter the last four digits of a Social Security number, a mother's maiden name, or may be requested to answer some query which, again, is not generally known to individuals other than subscriber 205.

In response to electronically determining that mobile subscriber 205 is in possession of communications device 102 and determining that mobile subscriber 205 has entered into an agreement (e.g., a contract) with a carrier providing communication services to communications device 102, identity verifier 230 may additionally electronically determine a reputation of mobile subscriber 205 with respect to communications device 102. For example, identity verification platform 232 may determine such reputation based, at least in part, on records of deterministic events involving communications device 102. Such records may relate, for example, to whether subscriber 205 has recently ported or reassigned a subscriber account identifier (e.g., telephone number) from a first communication services carrier to a second communication services carrier. In particular embodiments, a subscriber who has recently ported or reassigned a subscriber account identifier may be considered to have a compromised reputation, while a subscriber who has never ported, or has not ported a subscriber account identifier for an extended period of time, for example, may be considered to have a superior reputation. In particular embodiments, a subscriber who has maintained ownership of communications device 102 for only a short period of time (e.g., less than six months, or more or less, for example) may be considered to have a compromised reputation, while a subscriber who retains ownership of a communications device for a long period of time may be considered to have a superior reputation. In particular embodiments, a subscriber who has recently removed/replaced a SIM of communications device 102 may be considered to have a compromised reputation, while a subscriber who has never removed/replaced a SIM of device 102 may be considered to have a superior reputation. Claimed subject matter may embrace additional behaviors of mobile subscriber 205 with respect to communications device 102, which may be referred to as "online" events or "online" behaviors, virtually without limitation. In particular embodiments, an account identifier of a mobile subscriber may be more concretely tied to the digital identity of the subscriber if the reputation of the device corresponds to a relatively high value. Conversely, in particular embodiments, an account identifier of a mobile subscriber may be less concretely tied to the digital identity of the subscriber if the dictation of the device corresponds to a relatively low value.

In addition to online behaviors, which may refer to behaviors of mobile subscriber 205 with respect to communications device 102, identity verifier 230 may utilize off-line behaviors to determine a reputation of mobile subscriber 205 with respect to communications device 102. Deterministic events relating to off-line behaviors may refer to events undertaken by a subscriber that do not directly involve communications device 102. For example, a subscriber receiving a traffic citation (e.g., for unsafe speed, unsafe lane change, etc.) may represent a deterministic off-line event. In another example, a deterministic off-line event may refer to a subscriber having a record of voting in at least some (or perhaps all) recent city, county, state, and/or federal elections. In another example, a deterministic off-line event may refer to a subscriber obtaining a library card, becoming a member of a local service club, obtaining a gym or fitness center membership, obtaining a security clearance from a government agency, and so forth, and claimed subject matter is not limited in this respect. Accordingly, off-line events undertaken by a subscriber that may be representative of risky behavior may bring about a compromised reputation, while more reputable behaviors may give rise to a superior reputation of mobile subscriber 205 with respect to communications 102.

It should be noted that in some instances, identity verifier 230 may consider behavioral norms with respect to both online and off-line behaviors. For example, a mobile subscriber who tends to (historically, such as over a 10-year period) port his or her phone at least once a year, may be assigned a superior reputation in response to the subscriber porting his or her phone twice within the most recent two-year period. However, a mobile subscriber who has never ported his or her mobile device, may be assigned a compromised reputation in response to the subscriber porting his or her phone twice within the same two-year period.

Figure 3:
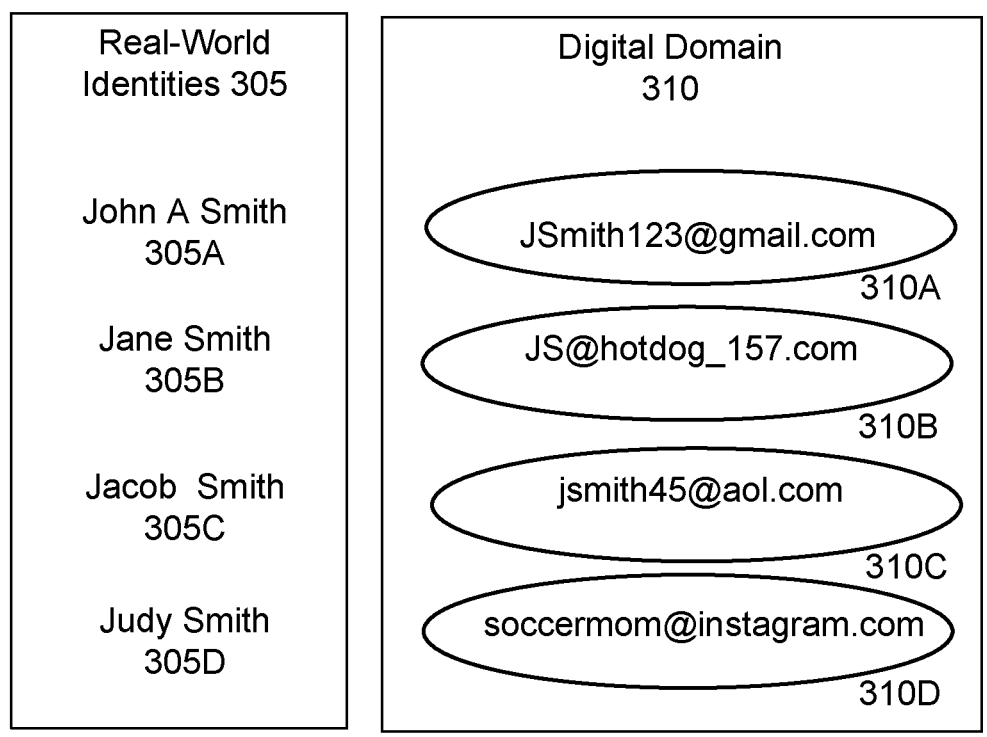
FIG. 3 is a diagram showing potential relationships between real-world identities of a subscriber and the identities of the subscriber in an electronic or digital domain, according to an embodiment.

FIG. 3 is a diagram showing potential relationships between a real-world identity of a subscriber and an identity of the subscriber in an electronic or digital domain, according to an embodiment 300. As shown in FIG. 3, real-world identity John A. Smith (305A), Jane Smith (305B), Jacob Smith (305C), and Judy Smith (305D) may, perhaps, be associated with one or more email addresses in an electronic or digital domain. Thus, determining whether any of email addresses jsmith123@gmail.com, JS@hotdog_157.com, jsmith45@aol.com, soccermom@instagram.com can be problematic. Further, it should be noted that the above-identified email addresses include very little, if any, personally-identifiable information.

Figure 4A:
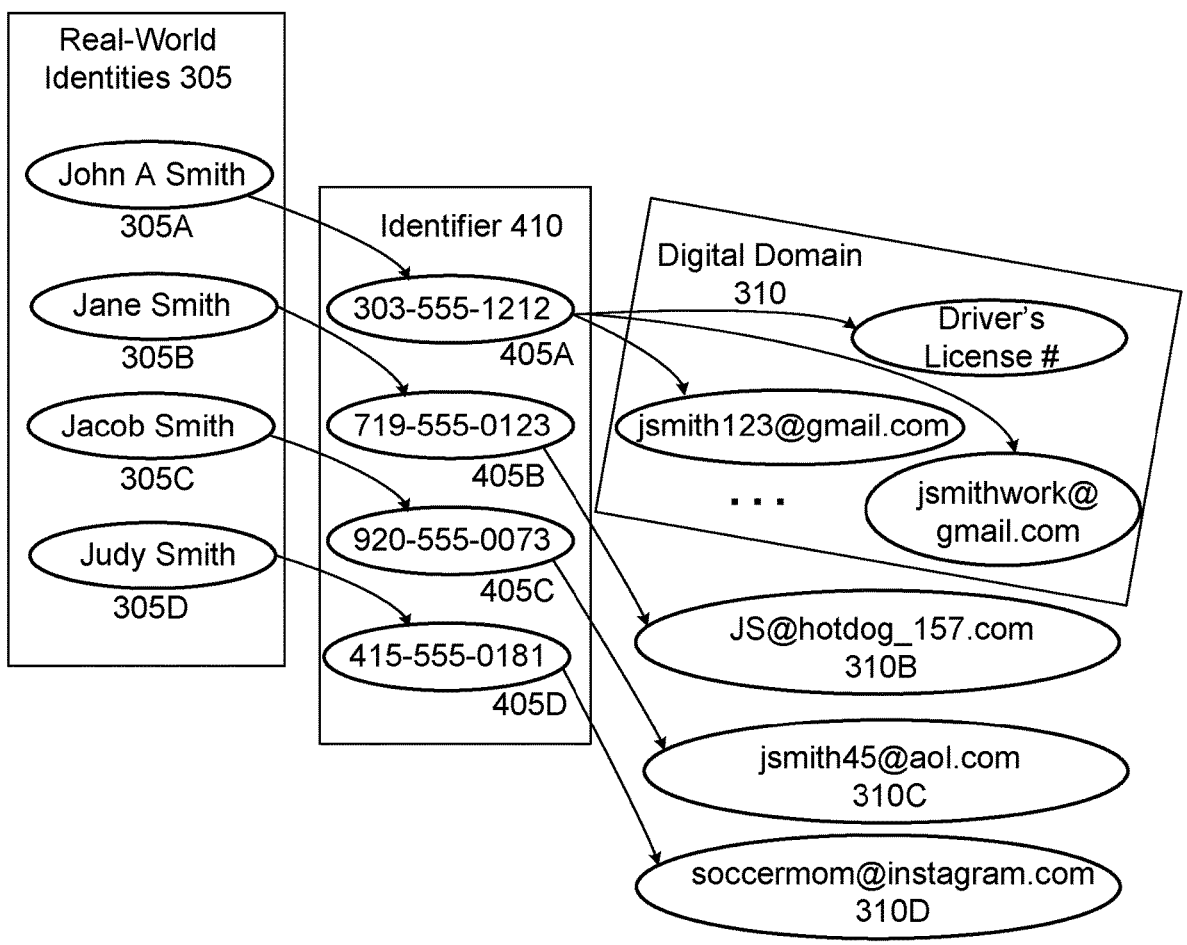
FIG. 4A is a diagram showing ties between real-world identities of the subscriber and the identities of the subscriber in an electronic or digital domain, according to an embodiment.

FIG. 4A is a graph showing real-world identity of a subscriber with an identity of the subscriber in an electronic or digital domain as facilitated by a subscriber account identifier, according to an embodiment 400. However, in alternate embodiments, rather than a subscriber account identifier, a subscriber account identifier or a subscriber-unique alias may be utilized. In the embodiment of FIG. 4A, for example, real-world identity (e.g., a subscriber) John Smith (305A) may be tied with the subscriber account identifier (e.g., telephone number 303-555-1212) or a subscriber-unique alias, perhaps by way of authentication via identity verifier 230, as described in FIG. 2. Accordingly, following authentication and/or verification, which may involve electronically determining proof of possession of a communications device by John Smith, electronically determining that the communications device is bound to a specific digital account, and electronically determining a favorable reputation of the communications device, a tie may be established between the subscriber John Smith and the subscriber account number 303-555-1212. In an alternative, rather than a subscriber account identifier, a tie may be established between a real-world identity and a digital domain utilizing a subscriber-unique alias. It should be noted that in alternative embodiments, a tie may be established between a subscriber and any other type of subscriber-specific identifier (e.g., IMSI, ICC ID, MSISDN, etc.), and claimed subject matter is not limited in this respect.

In response to a tie being established between real-world identity John Smith (a subscriber) and subscriber account identifier 303-555-1212, it may be appreciated that additional aspects of the subscriber's digital identity may be constructed. Accordingly, utilizing the subscriber account identifier or utilizing a subscriber-specific alias as a conduit, the email address jsmith123@gmail.com may be tied (e.g., indirectly) to the real-world identity John Smith. Similarly, it may be appreciated that any number of additional email addresses belonging to John Smith (e.g. jsmithwork@gmail.com), a physical address of John Smith, an employer of John Smith, a legal aspect of John Smith, such as a driver's license, a passport, or any other parameter stored in (or access to buy) an identity verifier, such as identity verifier 230 of FIG. 2, may be utilized to form additional aspects of John Smith's digital identity in an electronic or digital domain. FIG. 4A additionally shows mapping of digital identities of Jane Smith (305B), Jacob Smith (305C), Judy Smith (305D) with JS@hotdog_157, jsmith45@aol.com, and soccermom@instragram.com, respectively. Mapping of digital identities is facilitated through subscriber account identifiers 719-555-0123, 920-555-0073, and 414-555-0181, respectively. However, mapping of digital identities may also be facilitated utilizing subscriber-unique aliases.

Figure 4B:
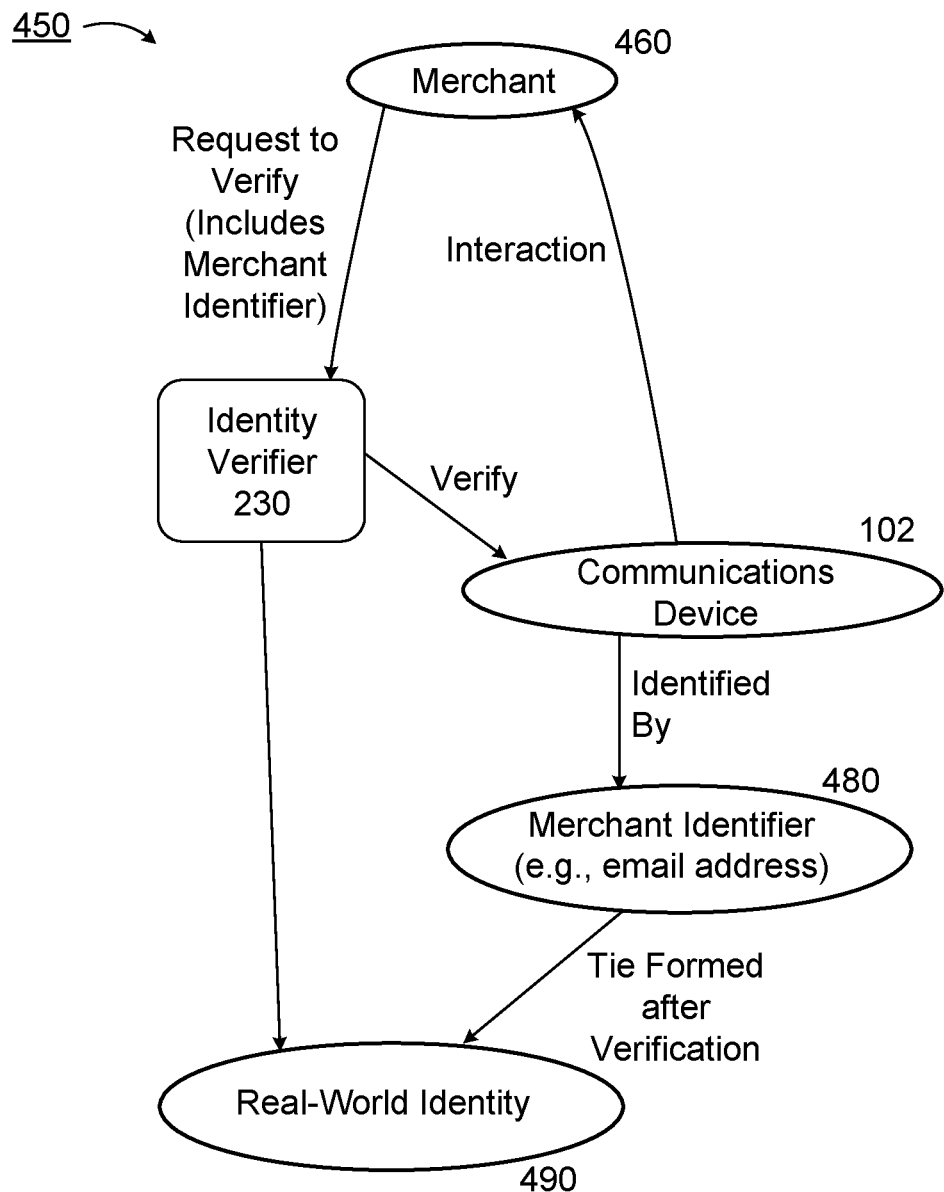
FIG. 4B is a diagram showing signal flow between a communications device, a merchant, and a verifying entity, according to an embodiment.

FIG. 4B is a diagram showing signal flow between a mobile device, a merchant, and a verifying entity, according to an embodiment 450. In the embodiment of FIG. 4B, a communications device (e.g., communications device 102) may undertake an interaction with merchant 460, who seeks to authenticate and/or verify the mobile device. Consequently, merchant 460 may interact with a verifier (e.g., identity verifier 230). Responsive to verification of the mobile device, the verifier may indicate such verification to communications device 102. Following verification of the communications device, identity verifier 230 may form or create a tie between the communications device 102 and merchant 460. Such a tie may be formed via merchant-assigned identifier 480, such as an email address assigned to the mobile device by the merchant. In particular embodiments, the tie between the mobile device and the merchant (in an electronic or digital domain) can be attached (or appended) to the subscriber account identity (e.g., also in electronic or digital domain) corresponding to real-world identity 490.

Figure 5:
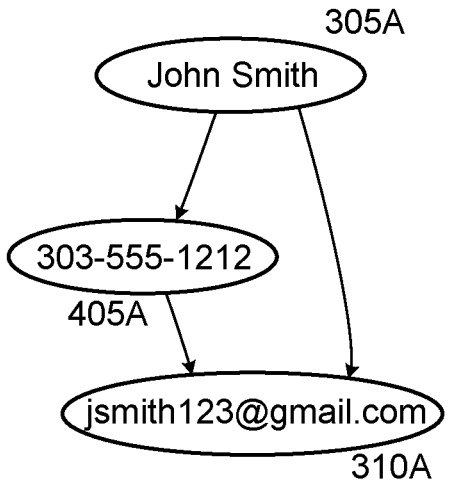
FIG. 5 is a graph showing a real-world identity of a subscriber an identity of the subscriber in an electronic or digital domain as facilitated by a subscriber account identifier or a subscriber-unique alias, according to an embodiment.

FIG. 5 is a graph showing a real-world identity of a subscriber an identity of the subscriber in an electronic or digital domain as facilitated by a subscriber account identifier or by a subscriber-unique alias, according to an embodiment 500. In FIG. 5, a conduit may be formed between the real-world identity of John Smith with the digital or electronic identity corresponding to John Smith. Such a time may be formed responsive to communicating with identity verifier 230 of FIG. 2. The conduit may be formed via subscriber account identifier 303-555-1212. However, in other embodiments, a conduit may be formed utilizing a either subscriber account identifier or a subscriber-unique alias, for example. In addition, in response to formation of a conduit utilizing a subscriber account identifier (e.g., a mobile telephone number), a new tie may be formed between John Smith's real-world identity and an additional aspect of John Smith's digital identity, such as the email address jsmith@gmail.com. It may be appreciated that additional new ties, such as between real-world John Smith and additional email addresses, one or more legal aspects of John Smith (e.g., a driver's license number a passport number), a bank account number, etc, may all be formed in a manner similar to formation of the new ties between John Smith and the email address jsmith@gmail.com.

Figure 6:
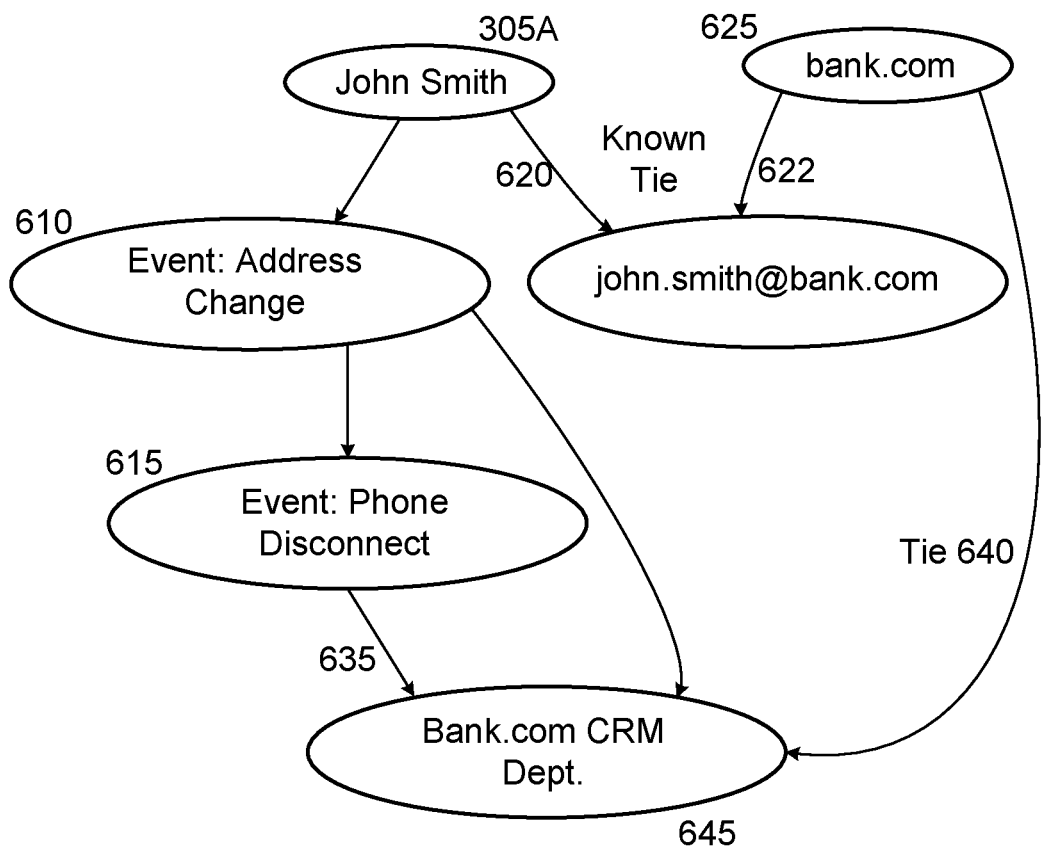
FIG. 6 is a graph showing use of a tie between a real world identity of a subscriber with an identity the subscriber in an electronic or digital domain to bring about additional ties between additional aspects of the individual's identity in an electronic or digital domain, according to an embodiment.

FIG. 6 is a graph showing use of a tie between an individual's real-world identity with an identity of the individual in an electronic or digital domain to bring about ties between additional aspects of the individual's identity in an electronic or digital domain, according to an embodiment 600. As shown in FIG. 6, a tie (e.g., known tie at 620) may be established between John Smith's real-world identity 305A and an aspect of John Smith's digital identity (e.g., an email address) associated with John Smith's banking and/or other financial transactions (john.smith@bank.com). Accordingly, in view of known tie 620 being established, a second known tie 622 may be established between the aspect of John Smith's digital identity (e.g., the email address john.smith@bank.com) and the web presence of John Smith's bank, also in the digital domain (e.g., bank.com). Further, responsive to formation of a second known tie 622 an additional tie 640 may be formed between the web presence of John Smith's bank (e.g., bank.com 625) and a customer relationship management portion of a bank or other financial institution associated with bank.com.

It may be appreciated that responsive to the construction of a plurality of ties between an individual's real-world identity and aspects of the individual's digital identity (in an electronic or digital domain), a mesh or web of ties may be established. In such a mesh or web of ties, discrete nodes, such as nodes 610 and 615, may operate to monitor and/or detect events with respect to changes in status of the real-world identity (e.g., the individual John Smith). Accordingly, in the embodiment of FIG. 6, in response to detection of a change in the physical address associated with John Smith, such as by way of accessing records stored in the authorization, authentication, and/or verification data store 234 (of FIG. 2), a corresponding event node in an electronic or digital domain may register such change in the physical address. For example, as shown in FIG. 6, node 610, which registers a physical address change, may influence, via tie 630, the customer relationship management portion of the bank or other financial institution associated with bank.com. In another example, also as shown in FIG. 6, node 615, which registers disconnection event 615 with respect to a subscriber account identifier (e.g., a phone number), may also influence, via tie 635, the customer relationship management portion of the bank or other financial institution associated with bank.com. Other changes with respect to the web presence of John Smith's bank in the digital domain, such as bank.com customer relations management (CRM) department 645 shown via tie 640.

Figure 7:
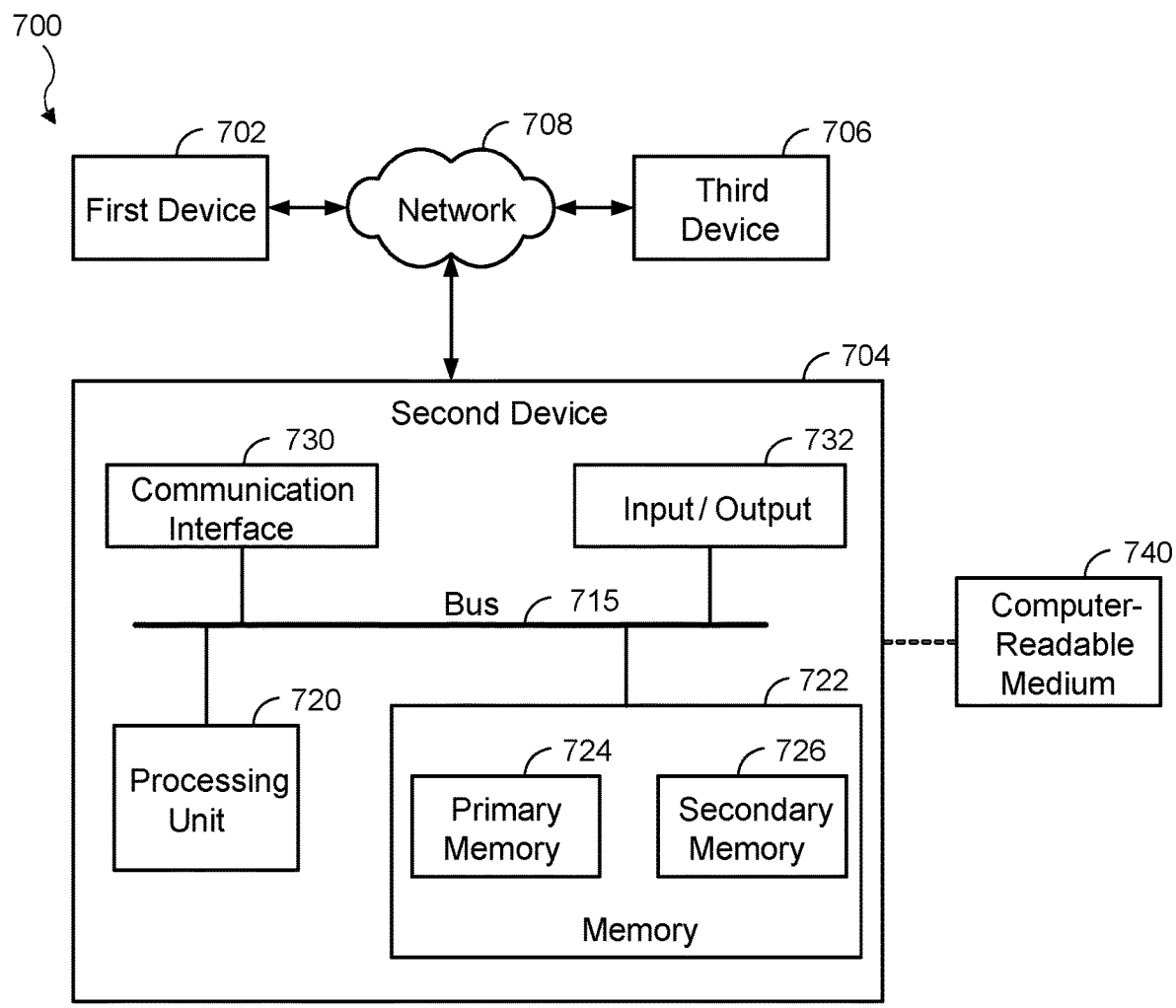
FIG. 7 is a schematic diagram illustrating an implementation of a computing device in an example computing environment, according to an embodiment.

FIG. 7 is a diagram showing a computing environment, according to an embodiment 700. In the embodiment of FIG. 7, first and third devices 702 and 707 may be capable of rendering a graphical user interface (GUI) for a network device, such as server device 140 of FIG. 1, so that a subscriber utilizing a communications device may engage in system use. Device 704 may potentially serve a similar function in this illustration. Likewise, in FIG. 7, computing device 702 ('first device' in FIG. 7) may interface with computing device 704 ('second device' in FIG. 7), which may, for example, also comprise features of a client computing device and/or a server computing device, in an embodiment. Processor (e.g., processing device) 720 and memory 722, which may comprise primary memory 724 and secondary memory 726, may communicate by way of a communication interface 730, for example. The term "computing device," in the context of the present patent application, refers to a system and/or a device, such as a computing apparatus that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 704, as depicted in FIG. 7, is merely one example, and claimed subject matter is not limited in scope to this particular example.

In FIG. 7, computing device 702 may provide one or more sources of executable computer instructions in the form of physical states and/or signals (e.g., stored in memory states), for example. Computing device 702 may communicate with computing device 704 by way of a network connection, such as via network 708, for example. As previously mentioned, a connection, while physical, may be virtual while not necessarily being tangible. Although computing device 704 of FIG. 7 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage mechanism. Memory 722 may comprise, for example, primary memory 724 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may comprise one or more articles utilized to store a program of executable computer instructions. For example, processor 720 may fetch executable instructions from memory and proceed to execute the fetched instructions. Memory 722 may also comprise a memory controller for accessing device readable-medium 740 that may carry and/or make accessible digital content, which may include code, and/or instructions, for example, executable by processor 720 and/or some other device, such as a controller, as one example, capable of executing computer instructions, for example. Under direction of processor 720, a non-transitory memory, such as memory cells storing physical states (e.g., memory states), comprising, for example, a program of executable computer instructions, may be executed by processor 720 and able to generate signals to be communicated via a network, for example, as previously described. Generated signals may also be stored in memory, also previously suggested.

Memory 722 may store electronic files and/or electronic documents, such as relating to one or more users, and may also comprise a machine-readable medium that may carry and/or make accessible content, including code and/or instructions, for example, executable by processor 720 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 720 may comprise one or more circuits, such as digital circuits, to perform at least a portion of a computing procedure and/or process. By way of example, but not limitation, processor 720 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 704 as including a component 732 operable with input/output devices, and communication bus 715, for example, so that signals and/or states may be appropriately communicated between devices, such as device 704 and an input device and/or device 704 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to cooperate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably.

Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as a computing device exclusively and/or a network device exclusively, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content," "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission"

communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. The lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, $4^{th}$, 5th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

In one example embodiment, as shown in FIG. 7, a system embodiment may comprise a local network (e.g., device 704 and medium 740) and/or another type of network, such as a computing and/or communications network. For purposes of illustration, therefore, FIG. 7 shows an embodiment 700 of a system that may be employed to implement either type or both types of networks. Network 708 may comprise one or more network connections, links, processes, services, applications, and/or resources to facilitate and/or support communications, such as an exchange of communication signals, for example, between a computing device, such as 702, and another computing device, such as 706, which may, for example, comprise one or more client computing devices and/or one or more server computing device. By way of example, but not limitation, network 708 may comprise wireless and/or wired communication links, telephone and/ or telecommunications systems, Wi-Fi networks, Wi-MAX networks, the Internet, a local area network (LAN), a wide area network (WAN), or any combinations thereof.

Example devices in FIG. 7 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 7 and in the text associated with the foregoing figure of the present patent application.

Figure 8:
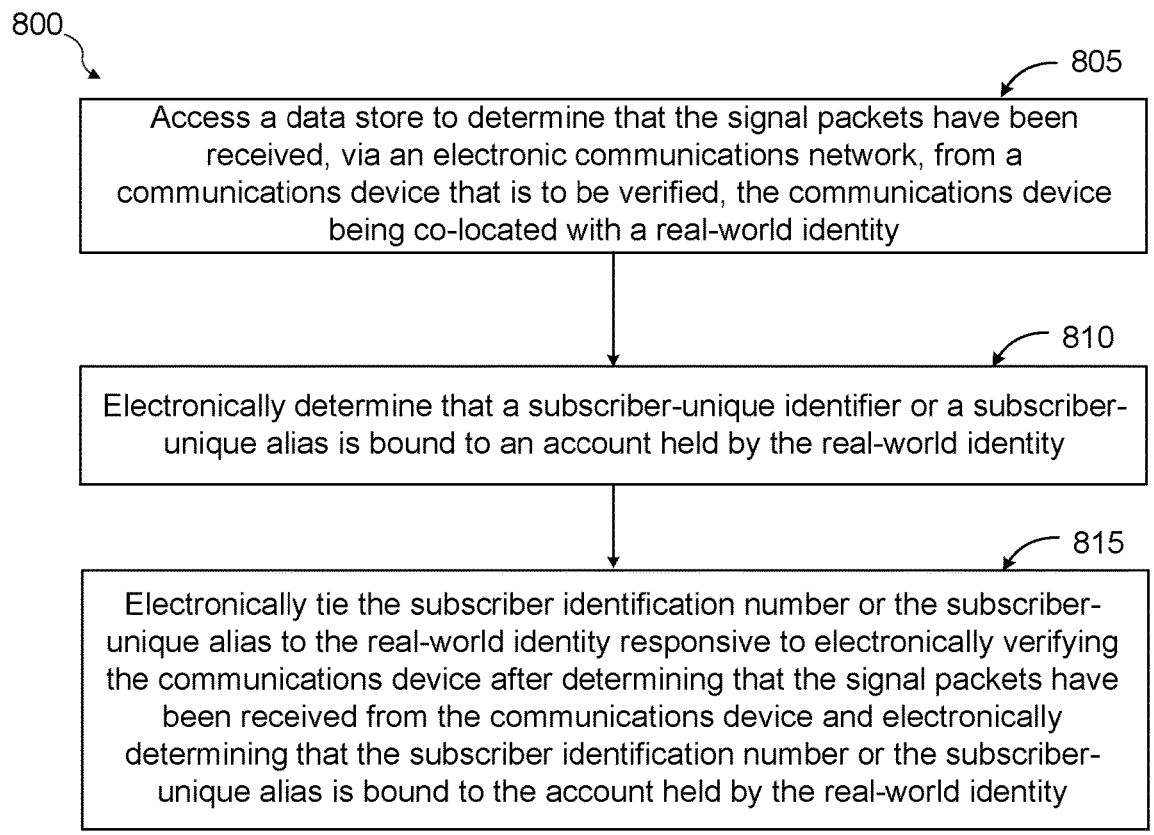
FIGS. 8-9 are flowcharts for methods of authenticating a communications device to tie real-world identities and digital identities, according to various embodiments.

FIG. 8 is a flowchart for a method of authenticating a communications device to link real-world identities and digital identities, according to an embodiment 800. It should be noted that the disclosed embodiments, such as the embodiment of FIG. 8, are intended to embrace numerous variations, including methods that may include actions in addition to those depicted in the figures, actions performed in an order different than those depicted in the figures, as well as methods including fewer steps than those depicted. The method of FIG. 8 begins at 805, which includes accessing a data store to determine that signal packets have been received, via an electronic communications network, from a communications device (e.g., device 102 of FIG. 1) co-located with a real-world identity (e.g., mobile subscriber 205 of FIG. 2). The method may continue at 810, which includes electronically determining that a subscriber-unique alias is bound to an account held by the real-world identity. The method may continue at 815, which includes electronically tying the subscriber-unique alias to the real-world identity responsive to electronically verifying the communications device after determining that the signal packets have been received from the communications device and electronically determining that the subscriber-unique alias is bound to the account held by the real-world identity.

Figure 9:
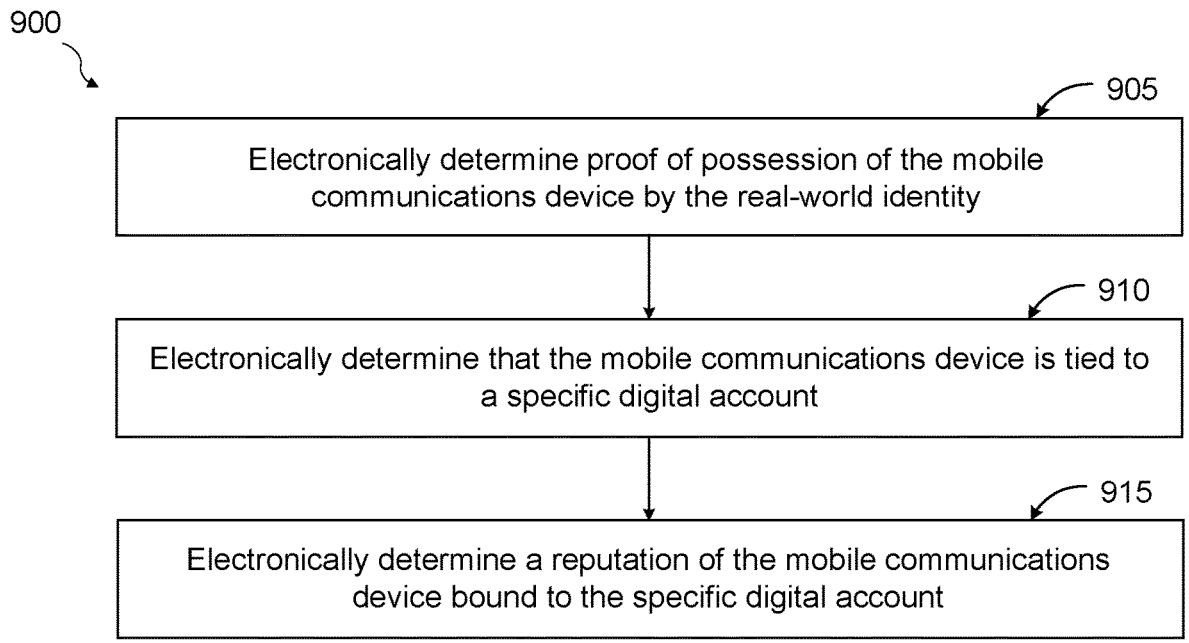

FIG. 9 is a flowchart for a method of authenticating mobile communications a communications device to tie real-world identities and digital identities, according to an embodiment 900. The method of FIG. 9 begins at 905, which includes electronically determining proof of possession of the communications device by an individual. The method may continue at 910, which includes electronically determining that the communications device is tied to a specific digital account. The method may continue at block 915, which includes electronically determining the reputation of the communications device bound to the specific digital account.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a user, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, an Internet service provider, a social network platform, just to provide a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

What is claimed is:

1. A method comprising:
   receiving, by an identity verification server, a verification request from a client server, wherein the verification request includes:
   a real-world identity of a subscriber, and
   a digital identity;
   confirming, by the identity verification server, a first bind between the real-world identity and a subscriber account identifier, wherein the subscriber account identifier is associated with a communications device;
   confirming, by the identity verification server, a second bind between the subscriber account identifier and the digital identity;
   responsive to determining, by the identity verification server, the subscriber is in physical possession of the communications device, and further responsive to determining, by the identity verification server, that a reputation of the communications device exceeds a threshold of trustworthiness, establishing a third bind between the real-world identity and the digital identity; and
   transmitting, by the identity verification server, to the client server an acknowledgement of the third bind.

2. The method of claim 1, wherein the subscriber account identifier excludes all parameters of the real-world identity of the subscriber.

3. The method of claim 1, wherein the determining, by the identity verification server, that the reputation of the communications device exceeds the threshold of trustworthiness includes determining the reputation of the communications device based at least in part on one or more records of one or more deterministic events.

4. The method of claim 3, wherein the determining the reputation of the communications device includes accessing a data store to obtain the one or more records of the one or more deterministic events.

5. The method of claim 4, wherein the one or more deterministic events comprise one or more deterministic events in relation to historical norms regarding behavior of the subscriber with respect to the communications device.

6. The method of claim 5, wherein the one or more deterministic events correspond to an off-line behavior.

7. The method of claim 5, wherein the one or more deterministic events corresponds to an online behavior comprising one or more of a porting of a subscriber identifier from a first communication services carrier to a second communication services carrier, a purchase or replacement of the communications device with a previously unused communications device, a removal and/or replacement of a subscriber identity module (SIM), or a password reset of the communications device.

8. The method of claim 5, wherein the one or more deterministic events corresponds to an online behavior including the communications device connecting to a particular uniform resource locator (URL).

9. The method of claim 1, wherein the determining, by the identity verification server, the subscriber is in physical possession of the communications device comprises initiating a comparison between a first parameter provided by the subscriber and a second parameter accessed from a data store.

10. The method of claim 1, further comprising:
wherein the establishing the third bind between the real-world identity and the digital identity comprises establishing the third bind between the real-world identity and one or more logical entities.

11. The method of claim 10, wherein the one or more logical entities comprise one or more email addresses, one or more IP addresses, one or more additional communication devices, one or more streaming devices, one or more social network identifiers, one or more account numbers of one or more financial institutions, or any combination thereof.

12. The method of claim 1, wherein the establishing the third bind between the real-world identity and the digital identity comprises establishing the third bind between the real-world identity and one or more legal entities.

13. The method of claim 12, wherein the one or more legal entities comprise one or more of a driver's license number, a passport number, or a legal address.

14. The method of claim 1, wherein the determining, by the identity verification server, the subscriber is in physical possession of the communications device comprises accessing one or more biometric parameters from the communications device.

15. An apparatus, comprising:
at least one processor of an identity verification server coupled to at least one memory device of the identity verification server to:
receive, by the identity verification server, a verification request from a client server, wherein the verification request includes:
a real-world identity of a subscriber, and
a digital identity;
confirm, by the identity verification server, a first bind between the real-world identity and a subscriber account identifier, wherein the subscriber account identifier is associated with a communications device;
confirm, by the identity verification server, a second bind between the subscriber account identifier and the digital identity;
responsive to a determination, by the identity verification server, that the subscriber is in physical possession of the communications device, and further responsive to a determination, by the identity verification server, that a reputation of the communications device exceeds a threshold of trustworthiness, establish a third bind between the real-world identity and the digital identity; and
transmit, by the identity verification server, to the client server an acknowledgement of the third bind.

16. The apparatus of claim 15, wherein the at least one processor of the identity verification server to determine that the reputation of the communications device exceeds the threshold of trustworthiness based at least in part on one or more records of one or more deterministic events.

17. The apparatus of claim 16, wherein the at least one processor of the identity verification server access a data store to obtain the one or more records of the one or more deterministic events.

18. The apparatus of claim 17, wherein the one or more deterministic events comprise one or more deterministic events in relation to historical norms regarding behavior of the real world identity subscriber with respect to the communications device.

19. The apparatus of claim 17, wherein the one or more deterministic events correspond to an online behavior.

20. The apparatus of claim 15, wherein, to determine that the subscriber is in physical possession of the communications device, the at least one processor of the identity verification server is to access one or more biometric parameters from the communications device.

21. The apparatus of claim 15, wherein, to establish the third bind between the real-world identity and the digital identity, the at least one processor of the identity verification server is to:
establish the third bind between the real-world identity and one or more logical entities, wherein the one or more logical entities comprise one or more email addresses, one or more IP addresses, one or more additional communication devices, one or more streaming devices, one or more social network identifiers, one or more account numbers of one or more financial institutions, or any combination thereof.

22. An article comprising:
a non-transitory storage medium having instructions stored thereon which, when executed by a special-purpose computing platform having a processor of an identity verification server coupled to at least one memory of the identity verification server are operable to:
receive, by the identity verification server, a verification request from a client server, wherein the verification request includes:
a real-world identity of a subscriber, and
a digital identity;
confirm, by the identity verification server, a first bind between the real-world identity and a subscriber account identifier, wherein the subscriber account identifier is associated with a communications device;
confirm, by the identity verification server, a second bind between the subscriber account identifier and the digital identity;
responsive to a determination, by the identity verification server, that the subscriber is in physical possession of the communications device, and further responsive to a determination, by the identity verification server, that a reputation of the communications device exceeds a threshold of trustworthiness, establish a third bind between the real-world identity and the digital identity; and
transmit, by the identity verification server, to the client server an acknowledgement of the third bind.

23. The article of claim 22, wherein, to determine that the subscriber is in physical possession of the communications device, the stored instructions are additionally operable to:
initiate a comparison between a first parameter provided by the subscriber and a second parameter accessed from a data store.

24. The article of claim 23, wherein, to establish the third bind between the real-world identity and the digital identity, the stored instructions are additionally operable to:
establish the third bind between the real-world identity and one or more logical entities.

25. The article of claim 24, wherein the one or more logical entities comprise one or more email addresses, one or more IP addresses, one or more additional communication devices, one or more streaming devices, one or more social network identifiers, one or more account numbers of one or more financial institutions, or any combination thereof.

26. The article of claim 24, wherein, to establish the third bind between the real-world identity and the digital identity, the stored instructions are additionally operable to:
- establish the third bind between the real-world identity and one or more legal entities.

27. The article of claim 26 wherein the one or more legal entities comprise one or more of a driver's license number, a passport number, and a legal address.

28. The article of claim 22, wherein, to determine that the subscriber is in physical possession of the communications device, the stored instructions are additionally operable to:
- access one or more biometric parameters from the communications device.

* * * * *